(12) United States Patent
Damman et al.

(10) Patent No.: US 9,662,867 B2
(45) Date of Patent: May 30, 2017

(54) CONFORMABLE AND DIE-CUTTABLE MACHINE DIRECTION ORIENTED LABELSTOCKS AND LABELS, AND PROCESS FOR PREPARING

(75) Inventors: Sebastiaan Bernardus Damman, Leiden (NL); Johannes Schut, Alphen Aan Den Rijn (NL)

(73) Assignee: Avery Dennison Corporation, Glendale, CA (US)

( * ) Notice: Subject to any disclaimer, the term of this patent is extended or adjusted under 35 U.S.C. 154(b) by 550 days.

(21) Appl. No.: 12/162,994

(22) PCT Filed: Jun. 13, 2007

(86) PCT No.: PCT/US2007/071084
§ 371 (c)(1),
(2), (4) Date: Dec. 3, 2008

(87) PCT Pub. No.: WO2007/146986
PCT Pub. Date: Dec. 21, 2007

(65) Prior Publication Data
US 2009/0130360 A1    May 21, 2009

Related U.S. Application Data

(60) Provisional application No. 60/804,757, filed on Jun. 14, 2006, provisional application No. 60/823,684, filed on Aug. 28, 2006.

(51) Int. Cl.
*C08J 5/18*        (2006.01)
*B32B 7/12*        (2006.01)
(Continued)

(52) U.S. Cl.
CPC ............ *B32B 27/32* (2013.01); *B29C 55/023* (2013.01); *B29C 55/06* (2013.01); *B32B 7/12* (2013.01);
(Continued)

(58) Field of Classification Search
None
See application file for complete search history.

(56) References Cited

U.S. PATENT DOCUMENTS 3,113,986 A    12/1963    Breslow et al.
3,207,735 A     9/1965    Wijga
(Continued)

FOREIGN PATENT DOCUMENTS

CN    1086488    5/1994
CN    1659030    8/2005
(Continued)

OTHER PUBLICATIONS

Written Opinion of the International Search Authority in corresponding International Application No. PCT/US2007/071084 mailed Oct. 24, 2007.
(Continued)

*Primary Examiner* — Frank D Ducheneaux
(74) *Attorney, Agent, or Firm* — Avery Dennison Corporation

(57) ABSTRACT

Die-cuttable and printable adhesive containing labelstocks for use in preparing die cut adhesive labels, and methods of preparing the labelstocks and die cut labels are described. The labelstocks comprise extruded machine direction oriented monolayer or multilayer films and an adhesive layer. The monolayer films comprise a mixture of about 25% to 80% by weight of a propylene polymer or copolymer, and from about 20% to about 75% by weight of a polyethylene. The films are stretch oriented in the machine direction at a temperature at about or above the melting temperature of the polyethylenes.

52 Claims, 1 Drawing Sheet

(51) Int. Cl.
*B32B 27/32* (2006.01)
*C09J 7/02* (2006.01)
*B29C 55/00* (2006.01)
*B29C 55/06* (2006.01)
*B29C 55/02* (2006.01)
*B29K 23/00* (2006.01)

(52) U.S. Cl.
CPC ............ *C08J 5/18* (2013.01); *C09J 7/0275* (2013.01); *B29K 2023/06* (2013.01); *B29K 2023/0641* (2013.01); *B29K 2023/12* (2013.01); *B32B 2307/514* (2013.01); *C08J 2323/02* (2013.01); *C09J 7/0207* (2013.01); *C09J 2201/622* (2013.01); *C09J 2203/334* (2013.01); *Y10T 428/1452* (2015.01)

(56) References Cited

U.S. PATENT DOCUMENTS

| | | |
|---|---|---|
| 3,207,736 A | 9/1965 | Wijga |
| 3,207,737 A | 9/1965 | Wales |
| 3,207,738 A | 9/1965 | Wijga |
| 3,207,739 A | 9/1965 | Wales |
| 3,251,905 A | 5/1966 | Zelinski of al. |
| 3,268,627 A | 8/1966 | Emrick |
| 3,390,207 A | 6/1968 | Moss et al. |
| 3,598,887 A | 8/1971 | Darcy et al. |
| 3,639,521 A | 2/1972 | Hsieh |
| 3,853,595 A | 12/1974 | Pedginski |
| 3,887,745 A | 6/1975 | Yoshii |
| 3,894,904 A | 7/1975 | Cook |
| 3,963,851 A | 6/1976 | Toyoda |
| 4,016,118 A | 4/1977 | Hamada et al. |
| 4,020,141 A | 4/1977 | Quinn et al. |
| 4,059,667 A | 11/1977 | Pangonis |
| 4,124,677 A | 11/1978 | Saijo et al. |
| 4,188,350 A | 2/1980 | Vicik et al. |
| 4,205,021 A | 5/1980 | Morita et al. |
| 4,207,363 A | 6/1980 | Lustig et al. |
| 4,208,356 A | 6/1980 | Fukawa et al. |
| 4,219,627 A | 8/1980 | Halasa et al. |
| 4,226,952 A | 10/1980 | Halasa et al. |
| 4,314,039 A | 2/1982 | Kawai et al. |
| 4,340,640 A | 7/1982 | Weiner |
| 4,371,645 A | 2/1983 | Mahaffey, Jr. |
| 4,399,180 A | 8/1983 | Briggs et al. |
| 4,399,181 A | 8/1983 | Yoshimura et al. |
| 4,405,667 A | 9/1983 | Christensen et al. |
| 4,407,873 A | 10/1983 | Christensen et al. |
| 4,407,874 A | 10/1983 | Gehrke |
| 4,430,377 A | 2/1984 | Yoshimura et al. |
| 4,434,264 A | 2/1984 | Ficker |
| 4,447,485 A | 5/1984 | Aritake |
| 4,451,533 A | 5/1984 | Wong |
| 4,463,113 A | 7/1984 | Nakahara et al. |
| 4,508,872 A | 4/1985 | McCollough, Jr. |
| 4,514,534 A | 4/1985 | DiNardo |
| 4,522,887 A | 6/1985 | Koebisu et al. |
| 4,525,416 A | 6/1985 | Hammerschmidt |
| 4,532,280 A | 7/1985 | Kobayashi et al. |
| 4,535,125 A | 8/1985 | McCullough, Jr. |
| 4,551,380 A | 11/1985 | Schoenberg |
| 4,564,559 A | 1/1986 | Wagner, Jr. et al. |
| 4,565,738 A | 1/1986 | Purdy |
| 4,578,316 A | 3/1986 | Clauson et al. |
| 4,578,429 A | 3/1986 | Gergen et al. |
| 4,581,262 A | 4/1986 | Karabedian |
| 4,585,679 A | 4/1986 | Karabedian |
| 4,588,775 A | 5/1986 | McCullough, Jr. |
| 4,604,324 A | 8/1986 | Nahmias et al. |
| 4,605,576 A | 8/1986 | Jabarin |
| 4,613,547 A | 9/1986 | Wagner, Jr. et al. |
| 4,613,643 A | 9/1986 | Nakamura et al. |
| 4,616,470 A | 10/1986 | Nakamura |
| 4,621,119 A | 11/1986 | Lu |
| 4,626,574 A | 12/1986 | Cancio et al. |
| 4,634,735 A | 1/1987 | Thiersault et al. |
| 4,643,945 A | 2/1987 | Kiang |
| 4,657,970 A | 4/1987 | Shiraki et al. |
| 4,659,612 A | 4/1987 | Balloni et al. |
| 4,663,216 A | 5/1987 | Toyoda et al. |
| 4,684,578 A | 8/1987 | Inoue et al. |
| 4,692,489 A | 9/1987 | Ficker et al. |
| 4,695,503 A | 9/1987 | Liu et al. |
| 4,704,421 A | 11/1987 | Teskin |
| 4,713,273 A | 12/1987 | Freedman |
| 4,716,068 A | 12/1987 | Seifried |
| 4,720,427 A | 1/1988 | Clauson et al. |
| 4,724,185 A | 2/1988 | Shah |
| 4,728,377 A | 3/1988 | Gallagher |
| 4,735,335 A | 4/1988 | Torterotot |
| 4,748,206 A | 5/1988 | Nogiwa et al. |
| 4,752,597 A | 6/1988 | Turner |
| 4,769,284 A | 9/1988 | Kakugo et al. |
| 4,778,697 A | 10/1988 | Genske et al. |
| 4,790,436 A | 12/1988 | Nakamura |
| 4,795,782 A | 1/1989 | Lutz et al. |
| 4,797,235 A | 1/1989 | Garland et al. |
| 4,798,081 A | 1/1989 | Hazlitt et al. |
| 4,808,561 A | 2/1989 | Welborn, Jr. |
| 4,833,024 A | 5/1989 | Mueller |
| 4,843,129 A | 6/1989 | Spenadel et al. |
| 4,855,187 A | 8/1989 | Osgood, Jr. et al. |
| 4,865,908 A | 9/1989 | Liu et al. |
| 4,880,422 A | 11/1989 | McBride |
| 4,906,315 A | 3/1990 | McGrew |
| 4,913,858 A | 4/1990 | Miekka et al. |
| 4,933,120 A | 6/1990 | D'Amato et al. |
| 4,937,299 A | 6/1990 | Ewen et al. |
| 4,956,232 A | 9/1990 | Balloni et al. |
| 4,957,790 A | 9/1990 | Warren |
| 4,966,795 A | 10/1990 | Genske et al. |
| 4,988,465 A | 1/1991 | Lustig et al. |
| 5,003,915 A | 4/1991 | D'Amato et al. |
| 5,026,592 A | 6/1991 | Janocha et al. |
| 5,026,778 A | 6/1991 | Fujii et al. |
| 5,028,480 A | 7/1991 | Dean |
| 5,049,436 A | 9/1991 | Morgan et al. |
| 5,049,605 A | 9/1991 | Rekers |
| 5,068,155 A | 11/1991 | Yamada et al. |
| 5,077,129 A | 12/1991 | Schinkel |
| 5,083,850 A | 1/1992 | Mallik et al. |
| 5,084,558 A | 1/1992 | Rausch et al. |
| 5,085,816 A | 2/1992 | McCord |
| 5,089,352 A | 2/1992 | Garland et al. |
| 5,100,728 A | 3/1992 | Plamthottam et al. |
| 5,110,671 A | 5/1992 | Balloni |
| 5,116,548 A | 5/1992 | Mallik et al. |
| 5,125,529 A | 6/1992 | Torterotot |
| 5,145,212 A | 9/1992 | Mallik |
| 5,151,309 A | 9/1992 | Dollinger |
| 5,164,227 A | 11/1992 | Miekka et al. |
| 5,164,444 A | 11/1992 | Bernard |
| 5,175,054 A | 12/1992 | Chu |
| 5,186,782 A | 2/1993 | Freedman |
| 5,190,609 A | 3/1993 | Lin et al. |
| 5,194,324 A | 3/1993 | Poirier |
| 5,206,075 A | 4/1993 | Hodgson, Jr. |
| 5,212,246 A | 5/1993 | Ogale |
| 5,213,744 A | 5/1993 | Bossaert |
| 5,217,812 A | 6/1993 | Lee |
| 5,242,650 A | 9/1993 | Rackovan et al. |
| 5,250,631 A | 10/1993 | McCullough, Jr. |
| 5,252,384 A | 10/1993 | Bothe et al. |
| 5,254,393 A | 10/1993 | Murschall et al. |
| 5,254,394 A | 10/1993 | Bothe et al. |
| 5,272,236 A | 12/1993 | Lai et al. |
| 5,275,886 A | 1/1994 | Chu et al. |
| 5,278,272 A | 1/1994 | Lai et al. |
| 5,286,552 A | 2/1994 | Lesca et al. |
| 5,286,564 A | 2/1994 | Cecchin et al. |
| 5,288,548 A | 2/1994 | Weber |
| 5,292,561 A | 3/1994 | Peiffer et al. |
| 5,298,561 A | 3/1994 | Cecchin et al. |

(56) References Cited

U.S. PATENT DOCUMENTS

| | | |
|---|---|---|
| 5,300,365 A | 4/1994 | Ogale |
| 5,316,777 A | 5/1994 | Toyoda et al. |
| 5,326,639 A | 7/1994 | Leonard et al. |
| 5,331,047 A | 7/1994 | Giacobbe |
| 5,332,542 A | 7/1994 | Yamanaka et al. |
| 5,342,868 A | 8/1994 | Kimura et al. |
| 5,358,792 A | 10/1994 | Mehta et al. |
| 5,360,868 A | 11/1994 | Mosier et al. |
| 5,362,782 A | 11/1994 | McCullough, Jr. et al. |
| 5,376,417 A | 12/1994 | Amano et al. |
| 5,380,572 A | 1/1995 | Kotani et al. |
| 5,380,810 A | 1/1995 | Lai et al. |
| 5,382,631 A | 1/1995 | Stehling et al. |
| 5,395,471 A | 3/1995 | Obijeski et al. |
| 5,407,732 A | 4/1995 | Dokurno |
| 5,409,992 A | 4/1995 | Eppert, Jr. |
| 5,414,040 A | 5/1995 | McKay et al. |
| 5,424,362 A | 6/1995 | Hwang et al. |
| 5,425,990 A | 6/1995 | Blum |
| 5,427,807 A | 6/1995 | Chum et al. |
| 5,435,963 A | 7/1995 | Rackovan et al. |
| 5,451,283 A | 9/1995 | Josephy et al. |
| 5,451,455 A | 9/1995 | Peiffer et al. |
| 5,453,466 A | 9/1995 | Pellegatti et al. |
| 5,462,809 A | 10/1995 | Berkowitz |
| 5,464,690 A | 11/1995 | Boswell |
| 5,468,440 A | 11/1995 | McAlpin et al. |
| 5,468,535 A | 11/1995 | Amano et al. |
| 5,474,820 A | 12/1995 | Murschall et al. |
| 5,475,075 A | 12/1995 | Brant et al. |
| 5,476,914 A | 12/1995 | Ewen et al. |
| 5,482,766 A | 1/1996 | Mathavan et al. |
| 5,482,780 A | 1/1996 | Wilkie et al. |
| 5,491,019 A | 2/1996 | Kuo |
| 5,492,757 A | 2/1996 | Schuhmann et al. |
| 5,496,600 A | 3/1996 | Peiffer et al. |
| 5,501,905 A | 3/1996 | Krallmann |
| 5,503,923 A | 4/1996 | Goto et al. |
| 5,508,090 A | 4/1996 | Peiffer et al. |
| 5,516,563 A | 5/1996 | Schumann et al. |
| 5,525,695 A | 6/1996 | Lai et al. |
| 5,527,601 A | 6/1996 | Crighton |
| 5,529,843 A | 6/1996 | Dries et al. |
| 5,530,054 A | 6/1996 | Tse et al. |
| 5,530,055 A | 6/1996 | Needham |
| 5,552,482 A | 9/1996 | Berta |
| 5,560,563 A | 10/1996 | Jenson, Jr. et al. |
| 5,560,885 A | 10/1996 | Murschall et al. |
| 5,560,997 A | 10/1996 | Kotani |
| 5,562,958 A | 10/1996 | Walton et al. |
| 5,573,723 A | 11/1996 | Peiffer et al. |
| 5,582,889 A | 12/1996 | Pedrini |
| 5,582,923 A | 12/1996 | Kale et al. |
| 5,585,193 A | 12/1996 | Josephy et al. |
| 5,591,390 A | 1/1997 | Walton et al. |
| 5,594,070 A | 1/1997 | Jacoby et al. |
| 5,595,705 A | 1/1997 | Walton et al. |
| 5,611,980 A | 3/1997 | Eto et al. |
| 5,611,982 A | 3/1997 | Mathavan et al. |
| 5,639,811 A | 6/1997 | Plamthottam et al. |
| 5,641,848 A | 6/1997 | Giacobbe et al. |
| 5,643,678 A | 7/1997 | Boswell |
| 5,662,985 A | 9/1997 | Jensen et al. |
| 5,665,800 A | 9/1997 | Lai et al. |
| 5,670,003 A | 9/1997 | Boswell |
| 5,672,224 A | 9/1997 | Kaufmann |
| 5,674,342 A | 10/1997 | Obijeski et al. |
| 5,674,580 A | 10/1997 | Boswell |
| 5,674,630 A | 10/1997 | Chatterjee |
| 5,677,383 A | 10/1997 | Chum et al. |
| 5,685,128 A | 11/1997 | Chum et al. |
| 5,691,043 A | 11/1997 | Keller et al. |
| 5,709,937 A | 1/1998 | Adams et al. |
| 5,711,839 A | 1/1998 | Dronzek et al. |
| 5,712,031 A | 1/1998 | Kelch et al. |
| 5,716,669 A | 2/1998 | LaRose et al. |
| 5,747,192 A | 5/1998 | Hughen et al. |
| 5,747,594 A | 5/1998 | deGroot et al. |
| 5,753,349 A | 5/1998 | Boswell |
| 5,756,169 A | 5/1998 | Peiffer et al. |
| 5,759,648 A | 6/1998 | Idias |
| 5,759,683 A | 6/1998 | Boswell |
| 5,773,155 A | 6/1998 | Kale et al. |
| 5,783,017 A | 7/1998 | Boswell |
| 5,783,638 A | 7/1998 | Lai et al. |
| 5,792,549 A | 8/1998 | Wilkie |
| 5,810,957 A | 9/1998 | Boswell |
| 5,844,045 A | 12/1998 | Kolthammer et al. |
| 5,847,053 A | 12/1998 | Chum et al. |
| 5,849,419 A | 12/1998 | Josephy et al. |
| 5,852,152 A | 12/1998 | Walton et al. |
| 5,863,665 A | 1/1999 | Kale et al. |
| 5,863,834 A | 1/1999 | Kawaguchi et al. |
| 5,869,575 A | 2/1999 | Kolthammer et al. |
| 5,874,139 A | 2/1999 | Bosiers et al. |
| 5,882,749 A | 3/1999 | Jones et al. |
| 5,885,699 A | 3/1999 | Watson et al. |
| 5,885,707 A | 3/1999 | Kaschel et al. |
| 5,885,721 A | 3/1999 | Su |
| 5,897,941 A | 4/1999 | Shah |
| 5,900,294 A | 5/1999 | Murschall et al. |
| 5,900,310 A | 5/1999 | Murschall et al. |
| 5,907,942 A | 6/1999 | Eichnauer |
| 5,922,800 A | 7/1999 | Crotty et al. |
| 5,932,157 A | 8/1999 | Dries et al. |
| 5,948,199 A | 9/1999 | McGrew |
| 5,948,839 A | 9/1999 | Chatterjee |
| 5,955,205 A | 9/1999 | Ramsey et al. |
| 5,961,766 A | 10/1999 | Chang et al. |
| 5,962,092 A | 10/1999 | Kuo et al. |
| 5,972,443 A | 10/1999 | Breck et al. |
| 5,972,444 A | 10/1999 | Patel et al. |
| 5,986,009 A | 11/1999 | Thoen et al. |
| 5,986,028 A | 11/1999 | Lai et al. |
| 5,998,017 A | 12/1999 | Eichbauer |
| 6,007,665 A | 12/1999 | Bourdelais et al. |
| 6,017,615 A | 1/2000 | Thakker et al. |
| 6,020,046 A | 2/2000 | Abhau |
| 6,026,953 A | 2/2000 | Nakamura et al. |
| 6,033,514 A | 3/2000 | Davis et al. |
| 6,042,930 A | 3/2000 | Kelch et al. |
| 6,051,305 A | 4/2000 | Hsu |
| 6,060,567 A | 5/2000 | Lai et al. |
| 6,072,005 A | 6/2000 | Kobylivker et al. |
| 6,074,762 A | 6/2000 | Cretekos et al. |
| 6,083,611 A | 7/2000 | Eichbauer et al. |
| 6,093,464 A | 7/2000 | Tokunaga et al. |
| 6,093,480 A | 7/2000 | Eichbauer |
| 6,094,889 A | 8/2000 | Van Loon et al. |
| 6,096,014 A | 8/2000 | Haffner et al. |
| 6,111,023 A | 8/2000 | Chum et al. |
| 6,111,102 A | 8/2000 | Schlegel |
| 6,113,271 A | 9/2000 | Scott |
| 6,127,043 A | 10/2000 | Lange |
| 6,136,439 A | 10/2000 | Coburn |
| 6,136,937 A | 10/2000 | Lai et al. |
| 6,140,442 A | 10/2000 | Knight et al. |
| 6,165,599 A | 12/2000 | Demeuse |
| 6,165,609 A | 12/2000 | Curatolo |
| 6,180,720 B1 | 1/2001 | Collina et al. |
| 6,183,856 B1 | 2/2001 | Amon |
| 6,194,532 B1 | 2/2001 | Maugans et al. |
| 6,197,886 B1 | 3/2001 | Chatterjee et al. |
| 6,204,330 B1 | 3/2001 | Braga et al. |
| 6,204,335 B1 | 3/2001 | Somers |
| 6,214,443 B1 | 4/2001 | Palmasi et al. |
| 6,214,447 B1 | 4/2001 | Nakagawa et al. |
| 6,214,935 B1 | 4/2001 | Sasaki et al. |
| 6,231,936 B1 | 5/2001 | Kozimor et al. |
| 6,231,975 B1 | 5/2001 | Kong et al. |
| 6,235,818 B1 | 5/2001 | Marizono et al. |
| 6,245,857 B1 | 6/2001 | Shamshoum et al. |
| 6,248,851 B1 | 6/2001 | Maugans et al. |
| 6,268,062 B1 | 7/2001 | Demeuse |

(56) References Cited

U.S. PATENT DOCUMENTS

| | | |
|---|---|---|
| 6,287,684 B1 | 9/2001 | Yamanaka et al. |
| 6,288,168 B1 | 9/2001 | Shiromoto et al. |
| 6,290,261 B1 | 9/2001 | Waggoner et al. |
| 6,299,984 B1 | 10/2001 | Forloni |
| 6,300,415 B1 | 10/2001 | Okayama et al. |
| 6,300,419 B1 | 10/2001 | Sehanobish et al. |
| 6,303,233 B1 | 10/2001 | Amon et al. |
| 6,306,518 B1 | 10/2001 | Shah et al. |
| 6,316,549 B1 | 11/2001 | Chum et al. |
| 6,319,945 B1 | 11/2001 | Lee et al. |
| 6,322,883 B1 | 11/2001 | Williams |
| 6,329,454 B1 | 12/2001 | Krabbenborg |
| 6,333,096 B1 | 12/2001 | Rodgers et al. |
| 6,340,532 B1 | 1/2002 | Huang et al. |
| 6,342,564 B1 | 1/2002 | Pitkanen et al. |
| 6,342,566 B2 | 1/2002 | Burkhardt et al. |
| 6,344,250 B1 | 2/2002 | Arthurs |
| 6,348,555 B1 | 2/2002 | Lai et al. |
| 6,362,270 B1 | 3/2002 | Chaudhary et al. |
| 6,364,988 B1 | 4/2002 | Lin |
| 6,365,682 B1 | 4/2002 | Alastalo et al. |
| 6,368,545 B1 | 4/2002 | Bailey et al. |
| 6,376,058 B1 | 4/2002 | Schut et al. |
| 6,379,605 B1 | 4/2002 | Lin |
| 6,384,123 B1 | 5/2002 | Young |
| 6,384,138 B1 | 5/2002 | Jacob et al. |
| 6,384,142 B1 | 5/2002 | Burkhardt et al. |
| 6,387,529 B1 | 5/2002 | Peet |
| 6,391,425 B1 | 5/2002 | Migliorini et al. |
| 6,410,648 B1 | 6/2002 | Sasaki et al. |
| 6,423,420 B1 | 7/2002 | Brant et al. |
| 6,436,496 B1 | 8/2002 | Rackovan et al. |
| 6,436,531 B1 | 8/2002 | Kollaja et al. |
| 6,436,534 B1 | 8/2002 | Knight et al. |
| 6,440,533 B1 | 8/2002 | Ray et al. |
| 6,441,094 B1 | 8/2002 | Cecchin et al. |
| 6,444,301 B1 | 9/2002 | Davidson |
| 6,448,355 B1 | 9/2002 | Knight et al. |
| 6,451,426 B2 | 9/2002 | Kong et al. |
| 6,455,150 B1 | 9/2002 | Sheppard |
| 6,455,171 B2 | 9/2002 | Scheibelhoffer et al. |
| 6,455,643 B1 | 9/2002 | Harlin et al. |
| 6,461,555 B1 | 10/2002 | Freedman |
| 6,461,706 B1 | 10/2002 | Freedman et al. |
| 6,469,110 B1 | 10/2002 | Harlin et al. |
| 6,472,077 B1 | 10/2002 | Cretekos et al. |
| 6,472,474 B2 | 10/2002 | Burkhardt et al. |
| 6,486,284 B1 | 11/2002 | Karande et al. |
| 6,489,019 B1 | 12/2002 | Shah et al. |
| 6,495,266 B1 | 12/2002 | Migliorini |
| 6,500,563 B1 | 12/2002 | Datta et al. |
| 6,500,901 B2 | 12/2002 | Somers et al. |
| 6,503,619 B1 | 1/2003 | Neal et al. |
| 6,503,635 B1 | 1/2003 | Kong et al. |
| 6,503,637 B1 | 1/2003 | Van Loon |
| 6,506,867 B1 | 1/2003 | Lai et al. |
| 6,511,755 B1 | 1/2003 | Mochizuki et al. |
| 6,515,093 B1 | 2/2003 | Somers |
| 6,518,377 B1 | 2/2003 | Shamshoum |
| 6,534,612 B1 | 3/2003 | Lai et al. |
| 6,548,611 B2 | 4/2003 | Lai et al. |
| 6,552,149 B2 | 4/2003 | Alastalo et al. |
| 6,566,446 B1 | 5/2003 | Parikh et al. |
| 6,566,450 B2 | 5/2003 | Debras et al. |
| 6,576,306 B2 | 6/2003 | Mehta et al. |
| 6,576,329 B2 | 6/2003 | Kong |
| 6,583,209 B2 | 6/2003 | Mehta et al. |
| 6,583,227 B2 | 6/2003 | Mehta et al. |
| 6,610,792 B2 | 8/2003 | Albe et al. |
| 6,623,866 B2 | 9/2003 | Migliorini et al. |
| 6,638,637 B2 | 10/2003 | Hager et al. |
| 6,642,290 B1 | 11/2003 | Dotson |
| 6,663,947 B2 | 12/2003 | Freedman et al. |
| 6,703,134 B1 | 3/2004 | Parr et al. |
| 6,703,447 B2 | 3/2004 | Coburn |
| 6,706,342 B2 | 3/2004 | Kong et al. |
| 6,716,501 B2 | 4/2004 | Kovalchuk et al. |
| 6,723,829 B1 | 4/2004 | Malm et al. |
| 6,734,256 B1 | 5/2004 | Everaerts et al. |
| 6,765,068 B2 | 7/2004 | Albe et al. |
| 6,780,936 B1 | 8/2004 | Agarwal et al. |
| 6,787,217 B2 | 9/2004 | Squier et al. |
| 6,790,516 B2 | 9/2004 | Niepelt |
| 6,803,421 B2 | 10/2004 | Joseph |
| 6,808,822 B2 | 10/2004 | Rajan et al. |
| 6,821,592 B2 | 11/2004 | Rodick |
| 6,828,019 B2 | 12/2004 | Kong et al. |
| 6,835,462 B2 | 12/2004 | Sun et al. |
| 6,844,079 B2 | 1/2005 | Holzer |
| 6,872,462 B2 | 3/2005 | Roberts et al. |
| 6,881,793 B2 | 4/2005 | Sheldon et al. |
| 6,887,582 B2 | 5/2005 | Lee et al. |
| 6,908,687 B2 | 6/2005 | Mendes |
| 6,919,113 B2 | 7/2005 | Therrian et al. |
| 6,919,407 B2 | 7/2005 | Tau et al. |
| 6,939,602 B2 | 9/2005 | McGee et al. |
| 6,946,535 B2 | 9/2005 | Tau et al. |
| 6,982,311 B2 | 1/2006 | Karande et al. |
| 6,991,261 B2 | 1/2006 | Dronzek et al. |
| 6,994,915 B2 | 2/2006 | Pelliconi et al. |
| 6,995,213 B2 | 2/2006 | Miller et al. |
| 7,041,765 B2 | 5/2006 | Tau et al. |
| 7,165,888 B2 | 1/2007 | Rodick |
| 7,186,366 B2 | 3/2007 | Schwinn |
| 7,217,463 B2 | 5/2007 | Henderson |
| 7,217,767 B2 | 5/2007 | Aguirre et al. |
| 7,309,742 B2 | 12/2007 | Poncelet et al. |
| 7,410,706 B2 | 8/2008 | Rodick |
| 7,449,522 B2 | 11/2008 | Aguirre et al. |
| 7,655,317 B2 | 2/2010 | Brant et al. |
| 7,700,189 B2 | 4/2010 | Amon et al. |
| 7,722,960 B2 | 5/2010 | Mills et al. |
| 7,754,814 B2 | 7/2010 | Barcus et al. |
| 7,794,848 B2 | 9/2010 | Breese |
| 7,842,365 B2 | 11/2010 | Riggs |
| 7,927,712 B2 | 4/2011 | Mills et al. |
| 7,951,462 B2 | 5/2011 | English et al. |
| 7,963,413 B2 | 6/2011 | Sierra-Gomez et al. |
| 8,012,558 B2 | 9/2011 | Behrens |
| 8,105,686 B2 | 1/2012 | Henderson et al. |
| 8,181,783 B2 | 5/2012 | Kakura et al. |
| 8,182,891 B2 | 5/2012 | Scott et al. |
| 8,709,610 B2 | 4/2014 | Yun et al. |
| 2001/0018125 A1 | 8/2001 | Shibuya et al. |
| 2001/0029232 A1 | 10/2001 | Eisen et al. |
| 2001/0039314 A1 | 11/2001 | Mehta et al. |
| 2001/0041776 A1 | 11/2001 | Lai et al. |
| 2001/0044506 A1 | 11/2001 | Mehta et al. |
| 2001/0051265 A1 | 12/2001 | Williams et al. |
| 2001/0055692 A1 | 12/2001 | Heffelfinger et al. |
| 2002/0006498 A1 | 1/2002 | Migliorini et al. |
| 2002/0006520 A1 | 1/2002 | Rasp et al. |
| 2002/0028340 A1 | 3/2002 | Fujii et al. |
| 2002/0037969 A1 | 3/2002 | Schut |
| 2002/0050319 A1 | 5/2002 | Nishizawa |
| 2002/0064646 A1 | 5/2002 | Cretekos et al. |
| 2002/0065384 A1 | 5/2002 | Knight et al. |
| 2002/0098303 A1 | 7/2002 | Rackovan |
| 2002/0146520 A1 | 10/2002 | Squier |
| 2002/0155283 A1 | 10/2002 | Carter et al. |
| 2002/0160170 A1 | 10/2002 | Ishige et al. |
| 2002/0182390 A1 | 12/2002 | Migliorini |
| 2002/0192466 A1 | 12/2002 | Lu |
| 2003/0008082 A1 | 1/2003 | Dronzek et al. |
| 2003/0021930 A1 | 1/2003 | Mientus |
| 2003/0049436 A1 | 3/2003 | Hager et al. |
| 2003/0049476 A1 | 3/2003 | Su |
| 2003/0072957 A1 | 4/2003 | Lee et al. |
| 2003/0078357 A1 | 4/2003 | Lai et al. |
| 2003/0087114 A1 | 5/2003 | Ferri et al. |
| 2003/0099792 A1 | 5/2003 | Andersson et al. |
| 2003/0113535 A1 | 6/2003 | Sun et al. |
| 2003/0114579 A1 | 6/2003 | Mori et al. |
| 2003/0134062 A1 | 7/2003 | Rajan et al. |

(56) References Cited

U.S. PATENT DOCUMENTS

| | | |
|---|---|---|
| 2003/0143357 A1 | 7/2003 | Frauenhofer |
| 2003/0148132 A1 | 8/2003 | Schwinn |
| 2003/0157313 A1 | 8/2003 | Shibuya et al. |
| 2003/0176603 A1 | 9/2003 | Ommundsen et al. |
| 2003/0180490 A1 | 9/2003 | Squier |
| 2003/0203230 A1 | 10/2003 | Pellingra et al. |
| 2003/0207137 A1 | 11/2003 | Kong et al. |
| 2003/0207138 A1 | 11/2003 | Kong et al. |
| 2003/0211298 A1 | 11/2003 | Migliorini |
| 2004/0013870 A1 | 1/2004 | Sheldon et al. |
| 2004/0023052 A1 | 2/2004 | Ambroise |
| 2004/0033349 A1 | 2/2004 | Henderson |
| 2004/0050479 A1 | 3/2004 | McEwen et al. |
| 2004/0072004 A1 | 4/2004 | Migliorini |
| 2004/0081776 A1 | 4/2004 | Squier |
| 2004/0110019 A1 | 6/2004 | Schubert et al. |
| 2004/0126518 A1 | 7/2004 | Mendes et al. |
| 2004/0127614 A1 | 7/2004 | Jiang |
| 2004/0197572 A1 | 10/2004 | Bell |
| 2004/0224175 A1 | 11/2004 | Henderson |
| 2005/0031824 A1 | 2/2005 | Rodick |
| 2005/0037191 A1 | 2/2005 | Ikenoya |
| 2005/0048303 A1 | 3/2005 | Henderson et al. |
| 2005/0069723 A1 | 3/2005 | Miller et al. |
| 2005/0113524 A1 | 5/2005 | Stevens |
| 2005/0129811 A1 | 6/2005 | Kraimer et al. |
| 2005/0167026 A1 | 8/2005 | Dronzek et al. |
| 2005/0214558 A1 | 9/2005 | Rodick |
| 2005/0234172 A1 | 10/2005 | Musgrave |
| 2005/0276525 A1 | 12/2005 | Hebert |
| 2005/0287359 A1 | 12/2005 | Breese |
| 2006/0008666 A1 | 1/2006 | Miller et al. |
| 2006/0009586 A1 | 1/2006 | Aguirre et al. |
| 2006/0024518 A1 | 2/2006 | Kong et al. |
| 2006/0024520 A1 | 2/2006 | Kong et al. |
| 2006/0040100 A1 | 2/2006 | Nemoto et al. |
| 2006/0057410 A1 | 3/2006 | Saavedra et al. |
| 2006/0147663 A1 | 7/2006 | Barre et al. |
| 2006/0251342 A1 | 11/2006 | Forman |
| 2006/0258811 A1 | 11/2006 | Barcus et al. |
| 2006/0293424 A1 | 12/2006 | Tse |
| 2007/0059545 A1 | 3/2007 | Emiliani et al. |
| 2007/0142801 A1 | 6/2007 | Zhou |
| 2008/0020191 A1 | 1/2008 | Mussig et al. |
| 2008/0134642 A1 | 6/2008 | Brown et al. |
| 2008/0199647 A1 | 8/2008 | Blackwell |
| 2009/0068486 A1 | 3/2009 | Blackwell et al. |
| 2009/0110944 A1 | 4/2009 | Aguirre et al. |
| 2009/0130360 A1 | 5/2009 | Damman et al. |
| 2009/0155614 A1 | 6/2009 | McLeod et al. |
| 2009/0220757 A1 | 9/2009 | Patel et al. |
| 2010/0002963 A1 | 1/2010 | Holbert et al. |
| 2010/0055429 A1 | 3/2010 | Lee |
| 2010/0300616 A1 | 12/2010 | Mitchell |
| 2010/0323134 A1 | 12/2010 | Bostian et al. |
| 2011/0039151 A1 | 2/2011 | Mitchell |
| 2011/0123743 A1 | 5/2011 | Cruz et al. |
| 2011/0163100 A1 | 7/2011 | Ueda |
| 2011/0177326 A1 | 7/2011 | Mitchell |
| 2012/0040197 A1 | 2/2012 | Suzuki et al. |
| 2012/0060997 A1 | 3/2012 | Mitchell et al. |
| 2012/0189830 A1 | 7/2012 | Niepelt et al. |
| 2012/0196102 A1 | 8/2012 | Cortes |
| 2013/0320019 A1 | 12/2013 | Tinoco |
| 2014/0205847 A1 | 7/2014 | Falla |
| 2014/0248480 A1 | 9/2014 | Vinck et al. |
| 2015/0151885 A1 | 6/2015 | Nakano |
| 2015/0190988 A1 | 7/2015 | Saxberg et al. |

FOREIGN PATENT DOCUMENTS

| | | |
|---|---|---|
| CN | 1720170 | 1/2006 |
| CN | 101489786 | 7/2009 |
| CN | 1533342 | 9/2009 |
| CN | 102083619 | 6/2011 |
| CN | 102137797 | 7/2011 |
| CN | 101239666 | 12/2011 |
| CN | 102596567 | 7/2012 |
| DE | 3710670 | 10/1987 |
| DE | 10147538 | 4/2003 |
| EP | 0185454 | 11/1980 |
| EP | 0029368 | 5/1981 |
| EP | 0122495 | 5/1989 |
| EP | 0341091 | 11/1989 |
| EP | 0377289 | 7/1990 |
| EP | 0416379 | 8/1990 |
| EP | 0119314 | 6/1991 |
| EP | 0444671 | 9/1991 |
| EP | 0619827 | 6/1993 |
| EP | 0477662 | 2/1995 |
| EP | 0 688 007 A1 | 12/1995 |
| EP | 0569621 | 1/1996 |
| EP | 0373660 | 2/1996 |
| EP | 0575465 | 4/1997 |
| EP | 0608369 | 5/1997 |
| EP | 0416815 | 8/1997 |
| EP | 0457082 | 11/1997 |
| EP | 0830248 | 3/1998 |
| EP | 0677832 | 6/1998 |
| EP | 0696300 | 12/1998 |
| EP | 0887381 | 12/1998 |
| EP | 0783006 | 1/1999 |
| EP | 0640649 | 3/1999 |
| EP | 0950511 | 4/1999 |
| EP | 0706448 | 7/1999 |
| EP | 0899278 | 11/1999 |
| EP | 0899279 | 11/1999 |
| EP | 0956947 | 11/1999 |
| EP | 0589213 | 1/2000 |
| EP | 0681592 | 8/2000 |
| EP | 0472946 | 10/2000 |
| EP | 0782589 | 6/2001 |
| EP | 1116745 | 7/2001 |
| EP | 1244743 | 10/2002 |
| EP | 1283242 | 2/2003 |
| EP | 0787167 | 5/2003 |
| EP | 0831994 | 8/2003 |
| EP | 0991679 | 11/2003 |
| EP | 1044995 | 11/2003 |
| EP | 0991719 | 12/2003 |
| EP | 0887380 | 2/2004 |
| EP | 1409360 | 4/2004 |
| EP | 0991684 | 1/2006 |
| EP | 1719712 | 11/2006 |
| EP | 1 813 423 A1 | 8/2007 |
| EP | 1 376 516 B1 | 5/2008 |
| EP | 0863183 | 5/2008 |
| EP | 1775122 | 7/2009 |
| EP | 1886934 | 6/2010 |
| EP | 2323921 | 4/2013 |
| GB | 1 171 219 | 10/1968 |
| JP | 52-126487 | 4/1976 |
| JP | 52-109580 | 9/1977 |
| JP | 54-130295 | 10/1979 |
| JP | 60-178132 | 9/1985 |
| JP | 62-056117 | 3/1987 |
| JP | 62-121709 | 6/1987 |
| JP | 08-099353 | 4/1996 |
| JP | 11-198310 | 7/1999 |
| JP | 2002-037311 | 2/2002 |
| JP | 2002-370328 | 12/2002 |
| JP | 2003-137314 | 5/2003 |
| JP | 2004-114610 | 4/2004 |
| JP | 2004-182310 | 7/2004 |
| JP | 2005-281599 | 10/2005 |
| JP | 2006-326890 | 12/2006 |
| JP | 2008-063004 | 3/2008 |
| JP | 2011-526867 | 10/2010 |
| WO | 90/00788 | 1/1990 |
| WO | 9003414 | 4/1990 |
| WO | 92/06836 | 4/1992 |
| WO | 93/03093 | 2/1993 |
| WO | 93/03695 | 3/1993 |
| WO | 93/10007 | 5/1993 |

(56) References Cited

FOREIGN PATENT DOCUMENTS

| | | |
|---|---|---|
| WO | 9313143 | 7/1993 |
| WO | 9409060 | 4/1994 |
| WO | 95/01397 | 1/1995 |
| WO | 98/21557 | 7/1995 |
| WO | 95/26268 | 10/1995 |
| WO | 95/32242 | 11/1995 |
| WO | 95/21557 | 7/1996 |
| WO | 97/01440 | 1/1997 |
| WO | 97/08238 | 3/1997 |
| WO | 98/01285 | 1/1998 |
| WO | 98/59002 | 12/1998 |
| WO | 00/13888 | 3/2000 |
| WO | 00/58090 | 10/2000 |
| WO | 01/03922 | 1/2001 |
| WO | 01/17775 | 3/2001 |
| WO | 01/046314 | 6/2001 |
| WO | 01/70484 | 9/2001 |
| WO | 02/11983 | 2/2002 |
| WO | 02/084343 | 10/2002 |
| WO | 03/011584 | 2/2003 |
| WO | 03/011584 A1 | 2/2003 |
| WO | 03/014219 | 2/2003 |
| WO | 03/018312 | 3/2003 |
| WO | 03/033262 | 4/2003 |
| WO | 03/093003 | 11/2003 |
| WO | 03/093004 | 11/2003 |
| WO | 03/106514 | 12/2003 |
| WO | 2004/003874 | 1/2004 |
| WO | 2004/09348 | 1/2004 |
| WO | 2004/055101 | 7/2004 |
| WO | WO 2004094129 A2 * | 11/2004 |
| WO | 2005/040270 | 5/2005 |
| WO | 2005/097492 | 10/2005 |
| WO | 2006/022973 | 3/2006 |
| WO | 2006/031435 | 3/2006 |
| WO | 2006/43919 | 4/2006 |
| WO | 2006/062504 | 6/2006 |
| WO | 2007/085283 | 8/2007 |
| WO | 2007/85283 | 8/2007 |
| WO | 2007/146986 | 12/2007 |
| WO | 2007/149900 | 12/2007 |
| WO | 2008/011402 | 1/2008 |
| WO | 2010/002834 | 1/2010 |
| WO | 2010/067111 | 6/2010 |
| WO | 2011/100029 | 8/2011 |
| WO | 2011/113008 | 9/2011 |
| WO | 2011/128669 | 10/2011 |
| WO | 2012/106025 | 8/2012 |

OTHER PUBLICATIONS

International Search Report of the International Search Authority in corresponding International Application No. PCT/US2007/071084 mailed Oct. 24, 2007.

International Preliminary Report on Patentability in corresponding International Application No. PCT/US2007/071084 mailed Jul. 22, 2008.

NR. Dharmarajan and T.C. Yu, Modifying Polypropylene with a Metallocene Plastomer, Plastics Engineering, pp. 33-35, Aug. 1996 (3 pages).

Huntsman, product data sheet for P5M4K-046, May 2002 (1 page).

ExxonMobil Chemical, product data sheet for EXACT 4151, Oct. 15, 1999 (1 page).

Webpage printout from www.polymersdatabase.com for VLDPE printed Jul. 29. 2003, copyright notice 2000, CRC Press, pp. 1-4 (4 pages).

Webpage printout from www.polymersdatabase.com for LDPE printed Jul. 29, 2003, copyright notice 2000, CRC Press, pp. 1-9 (9 pages).

Webpage printout from www.polymersdatabase.com for LLDPE printed Jul. 29, 2003, copyright notice 2000, CRC Press, pp. 1-10 (10 pages).

Webpage printout from www.polymersdatabase.com for MDPE printed Jul. 29, 2003, copyright notice 2000, CRC Press, pp. 1-5 (5 pages).

Webpage printout from www.polymersdatabase.com for Polyethylene, High Density printed Jul. 29, 2003, copyright notice 2000, CRC Press, pp. 1-13 (13 pages).

Webpage printout from www.polymersdatabase.com for Ultra High Molecular Weight PE printed Jul. 29, 2003, copyright notice 2000, CRC Press, pp. 1-6 (6 pages).

EP 03 01 4616, European Search Report mailed Sep. 26, 2003.

Written Opinion mailed May 15, 20016 in corresponding International Application No. PCT/US03/20281.

PCT/US03/20281, PCT International Search Report mailed Jan. 22, 2004.

M. Tanaka; High Value Added Film Using an Olefin Based Elastomer: Specialty Plastics Conference, Zuerich, Dec. 3-4, 1990.

Tafmer(R) "A"—A New Polyolefin Resin wth Excellent Flexibility, Mitsui Petrochemical Industries, Jan. 1977 (Mitsui, 1977).

Tamfer(R) "P"—A New-Type Elastomer as Plasties Modifying Agent Supplied in Pellet Form, Mitsui Petrochemical Industries, Aug. 1975 (Mitsui, 1975).

PCT/US02/24368 PCT International Search Report mailed Dec. 12, 2002.

PCT/US2007/073674, PCT International Search Report mailed Dec. 21, 2007.

EP 02 76 1212, Supplementary European Search Report dated May 14, 2007, (alw).

"MDO Films: Lots of Promise, Big Challenges," Jan H. Schut, Plastics Technology, Feb. 2005.

"Applications and Advantages of Beta-Crystalline Polypropylene," Philip Jacoby, Society of Plastics Engineers, Plastics Research Online, 10/2417/spepro.005015, 3 pages, copyright 2013.

International Search Report and Written Opinion issued in corresponding IA No. PCT/US2007/071633 dated Dec. 14, 2007.

International Preliminary Report on Patentability issued in corresponding IA No. PCT/US2007/071633 dated Jan. 8, 2009.

Kissin, Yury, Alkene Polymerization Reactions with Transition Metal Catalysts, Mar. 2008.

International Search Report and Written Opinion issued in corresponding IA No. PCT/US2015/033707 dated Aug. 6, 2015.

International Preliminary Report on Patentability issued in corresponding IA No. PCT/US2015/033707 dated Dec. 15, 2016.

International Preliminary Report on Patentability issued in corresponding IA No. PCT/CN2012/080154 dated Feb. 17, 2015.

International Search Report and Written Opinion issued in corresponding IA No. PCT/CN20121080154 dated May 23, 2013.

International Peliminary Report on Patentability issued in corresponding IA No. PCT/US2013/024003 dated Aug. 14, 2014.

International Search Report issued in corresponding IA No. PCT/US2013/024003 dated Sep. 19, 2013.

* cited by examiner

CONFORMABLE AND DIE-CUTTABLE MACHINE DIRECTION ORIENTED LABELSTOCKS AND LABELS, AND PROCESS FOR PREPARING

CROSS REFERENCE TO RELATED APPLICATIONS

This application is a national phase of International Application No. PCT/US2007/071084, filed Jun. 13, 2007, which claims priority to U.S. Provisional Application Ser. No. 60/804,757, filed Jun. 14, 2006 and U.S. Provisional Application Ser. No. 60/823,684 filed Aug. 28, 2006. The entire disclosure of this international application and the entire disclosure of both provisional applications are hereby incorporated by reference.

FIELD OF THE INVENTION

This invention relates to labelstocks that are conformable, printable and die-cuttable, and to a process for preparing such labelstocks and die-cut labels. More particularly, the invention relates to die-cuttable and printable adhesive containing labelstocks useful in preparing labels, and to the die-cut labels obtained therefrom.

BACKGROUND OF THE INVENTION

It has long been known to manufacture and distribute pressure-sensitive adhesive labelstock for labels by providing a layer of a face or facestock material for the label or sign backed by a layer of pressure sensitive adhesive and PSA which in turn, generally is covered by a release liner or carrier. The liner or carrier protects the adhesive during shipment and storage and allows for efficient handling of an array of individual labels after the labels are die-cut and the matrix is stripped from the layer of facestock material and up to the point where the individual labels are dispensed in sequence on a labeling line. During the time from die-cutting to dispensing, the liner or carrier remains uncut and may be rolled and unrolled for storage, transit and deployment of the array of individual labels carried thereon.

Failure to reliably dispense is typically characterized by the label following the carrier around a peel plate without dispensing or "standing-off" from the carrier for application to the substrate. Such failure to dispense is believed to be associated with excessive release values between the label facestock material and the liner. Dispensability also is dependent upon the stiffness of the facestock. Failure to dispense may also be characterized by the wrinkling of the label due to lack of label stiffness at the dispensing speed as it is transferred from the carrier to the substrate. Another particular need in labeling applications is the ability to apply polymeric-film labels at high line speeds, since an increase in line speed has obvious cost saving advantages.

There is also a growing need for down-gauging of label films in order to improve the cost performance ratio of labelstock. A disadvantage of down-gauging of films is that the stiffness in the machine direction will become too low to guarantee good dispensing of the labels. This problem has been overcome in the past by utilizing materials having a higher modulus of elasticity and, hence, higher stiffness.

Polypropylenes, and in particular biaxially oriented polypropylene (BOPP), have been utilized successfully in down-gauging applications since polypropylene is relatively inexpensive and exhibits sufficient stiffness to dispense well. However, polypropylenes in general exhibit relatively high tensile modulus values in both machine-direction and cross-direction which results in labels that are not very conformable, and polypropylenes are not easily printable with UV based inks that are most commonly used to print on pressure sensitive labels. Accordingly, it is common practice to improve the printability of polypropylene by adding a print skin (by coextrusion) or a print receptive coating. These solutions, however, add complexity and costs to the production process.

SUMMARY OF THE INVENTION

In one embodiment, this invention relates to a die-cuttable and printable adhesive containing labelstock for use in adhesive labels that comprises (A) an extruded machine direction oriented monolayer film facestock having an upper surface and a lower surface and comprising a mixture of (A-1) from about 25% to about 80% by weight of at least one propylene polymer or copolymer or a blend of at least one propylene polymer or copolymer, and (A-2) from about 20% to about 75% by weight of a polyethylene wherein the machine direction oriented film is obtained by stretching the extruded film in the machine direction at a stretching temperature of from about the melting temperature of the polyethylene up to the melting temperature of the propylene polymer or copolymer, and (B) an adhesive layer having an upper surface and a lower surface wherein the upper surface of the adhesive layer is adhesively joined to the lower surface of the facestock.

In another embodiment, the invention relates to a die cuttable and printable adhesive containing labelstock for use in adhesive labels that comprises (A) an extruded machine direction oriented multilayer film facestock that comprises (A-1) a base layer comprising a mixture of at least one propylene polymer or copolymer and a polyethylene polymer and having an upper surface and a lower surface (A-2) at least one skin layer in contact with a surface of the base layer wherein the skin layer comprises a mixture of (A-2a) from about 25% to about 80% by weight of at least one propylene homopolymer or copolymer or a blend of at least one propylene homopolymer and at least one propylene copolymer, and (A-2b) from about 20% to about 75% by weight of at least one polyethylene wherein the propylene content of the base layer is greater than the propylene content of the skin layer and the machine direction oriented film is obtained by stretching the extruded film at a stretching temperature of from about the melting temperature of the polyethylene up to the melting temperature of the propylene polymer or copolymer, and (B) an adhesive layer having an upper surface and a lower surface wherein the upper surface of the adhesive layer is adhesively joined to the lower surface of the facestock.

In another embodiment, the invention relates to die-cut labels which are obtained from the adhesive labelstock of the invention.

In yet another embodiment, the invention relates to a process for preparing die-cuttable and printable adhesive containing labelstocks that comprises (A) extruding a monolayer film having an upper surface and a lower surface and comprising a mixture of
- (A-1) from about 25% to about 80% by weight of at least one propylene homopolymer or copolymer or a blend of at least one propylene homopolymer and at least one propylene copolymer, and
- (A-2) from about 20% to about 75% by weight of at least one polyethylene (B) stretch orienting the extruded film in the machine direction at a stretching temperature of from about the melting temperature of the polyethylene up to the melting temperature of the propylene homopolymer or copolymer, and (C) applying an adhesive layer having an upper surface and a lower surface to the lower surface of the film wherein the upper surface of the adhesive layer is joined to the lower surface of the film to form an adhesive labelstock.

In yet another embodiment, die-cut labels are prepared from the above prepared adhesive labelstock by (D) applying a release liner to the lower surface of the adhesive layer, and (E) die-cutting labels in the adhesive labelstock but not the liner.

In another embodiment the invention relates to a process for preparing machine direction oriented multilayer films that comprises (A) preparing a multilayer film facestock comprising
- (A-1) a base layer comprising a mixture of at least one propylene polymer or copolymer and a polyethylene polymer and having an upper surface and a lower surface
- (A-2) at least one skin layer in contact with a surface of the base layer wherein the skin layer comprises a mixture of
  - (A-2a) from about 25% to about 80% by weight of at least one propylene homopolymer or copolymer or a blend of at least one propylene homopolymer and at least one propylene copolymer, and
  - (A-2b) from about 20% to about 75% by weight of at least one polyethylene (B) stretch orienting the multilayer film in the machine direction at a stretching temperature at about or above the melting temperature of the polyethylene up to the melting temperature of the propylene homopolymer or copolymer, and (C) applying an adhesive layer having an upper surface and a lower surface wherein the upper surface of the adhesive layer is joined to the lower surface of the multilayer film.

In yet another embodiment, the invention relates to a process for preparing die cut machine direction oriented multilayer film labels that comprises (A) preparing a multilayer film facestock comprising
- (A-1) a base layer comprising a mixture of at least one propylene polymer or copolymer and a polyethylene polymer and having an upper surface and a lower surface
- (A-2) at least one skin layer in contact with a surface of the base layer wherein the skin layer comprises a mixture of
  - (A-2a) from about 25% to about 80% by weight of at least one propylene homopolymer or copolymer or a blend of at least one propylene homopolymer and at least one propylene copolymer, and
  - (A-2b) from about 20% to about 75% by weight of at least one polyethylene (B) stretch orienting the multilayer film in the machine direction at a stretching temperature at about or above the melting temperature of the polyethylene up to the melting temperature of the propylene homopolymer or copolymer, (C) applying an adhesive layer having an upper surface and a lower surface wherein the upper surface of the adhesive layer is joined to the lower surface of the multilayer film, (D) applying a release liner to the lower surface of the adhesive layer, and (E) die-cutting labels in the adhesive labelstock.

In one embodiment, the polyethylene of the monolayer or multilayer film facestock comprises a low density polyethylene. The labelstock and labels obtained in accordance with the present invention exhibit desirable stiffness, conformability, dispensability and printability characteristics.

DESCRIPTION OF THE EMBODIMENTS

Figure 1A:
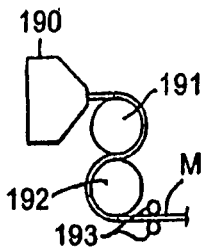
FIGS. 1A to 1C are schematic illustrations showing a process for making the machine direction monolayer films used in the present invention.

The present invention, in one embodiment, relates to the discovery that machine-direction oriented monolayer and multilayer films can be prepared that are characterized as having improved conformability, die-cuttability, printability and/or dispensability. As will be described in more detail hereinafter, the adhesive containing labelstocks of the invention, in one embodiment, comprise (A) an extruded machine direction oriented monolayer film facestock having an upper surface and a lower surface and comprising a mixture of
- (A-1) from about 25% to about 80% by weight of at least one propylene polymer or copolymer or a mixture of two or more thereof, and
- (A-2) from about 20% to about 75% by weight of a polyethylene, wherein the machine direction oriented film is obtained by stretching the extruded film in the machine direction at a stretching temperature of from about the melting temperature of the polyethylene up to the melting temperature of the propylene polymer or copolymer, and (B) an adhesive layer having an upper surface and a lower surface wherein the upper surface of the adhesive layer is adhesively joined to the lower surface of the facestock.

The propylene homopolymers that may be utilized as component (A-1) in the monolayer film either alone or in combination with a propylene copolymer as described herein include a variety of propylene homopolymers such as those having melt flow rates (MFR) of from about 1 to about 20 g/10 min. as determined by ISO 1133 (230° C. and 2.16 kg). In another embodiment, melt flow rate of the propylene homopolymers that can be utilized in the present invention may range from about 1 to about 15 g/10 min.

A number of useful propylene homopolymers are available commercially from a variety of sources. SABIC® PP 500P is a propylene homopolymer having a melt flow rate of 3.1 g/10 min., a density of 0.905 g/cm$^3$ and a DSC melting point of 160° C. SABIC® PP 520P is a propylene homopolymer having a melt flow rate of 10.5 g/10 min. and a density of 0.905 g/cm$^3$. Another useful propylene homopolymer is SABIC® PP 575P which has a melt flow rate of 10.5 g/10 min., a density of 0.905 g/cm$^3$ and a DSC melting point of 167° C. Other commercially available propylene homopolymers that can be utilized in the films of the present invention include those listed in the following Table I.

TABLE I

Commercial Propylene Homopolymers

| Commercial Designation | Company | Melt Flow Rate (g/10 min) | Density (g/cm$^3$) |
|---|---|---|---|
| WRD5-1057 | Union Carbide | 12.0 | 0.90 |
| DX5E66 | Union Carbide | 8.8 | 0.90 |
| 5A97 | Union Carbide | 3.9 | 0.90 |
| Z9470 | Fina | 5.0 | 0.89 |
| Z9470HB | Fina | 5.0 | 0.89 |
| Z9550 | Fina | 10.0 | 0.89 |
| 6671XBB | Fina | 11.0 | 0.89 |
| 3576X | Fina | 9.0 | 0.89 |
| 3272 | Fina | 1.8 | 0.89 |
| SF6100 | Montell | 11.0 | 0.90 |
| STAMYLAN® P 17M10 | DSM | 10.0 | 0.90 |
| STAMYLAN® P 17U10 | DSM | 3.0 | 0.90 |
| APPRYL® 3020 BTI | Atofina | 1.9 | 0.905 |
| APPRYL® 3030 FNI | Atofina | 3 | 0.905 |
| APPRYL® 3050 MNI | Atofina | 5 | 0.905 |
| APPRYL® 3060 MN5 | Atofina | 6 | 0.902 |
| BORMOD® HD905CF | Borealis | 8 | 0.905 |
| MOPLEN® HP522J | Basell | 3 | 0.9 |

The propylene copolymers that can be utilized as a component in the monolayer film facestock in accordance with the present invention generally comprise copolymers of propylene and up to about 40% by weight of at least one alpha olefin selected from ethylene and alpha olefins containing from 4 to about 8 carbon atoms. Examples of useful alpha olefins include ethylene, 1-butene, 1-pentene, 4-methyl-1-pentene, 1-hexene, 1-heptene, and 1-octene. More often, the copolymers of propylene that may be utilized in the present invention comprise copolymers of propylene with ethylene, 1-butene or 1-octene. The propylene-alpha-olefin copolymers useful in the present invention include random copolymers as well as block copolymers. Blends of the copolymers as well as blends of the copolymers with propylene homopolymers can be utilized in the film compositions of the invention.

In one embodiment, the propylene copolymers are propylene-ethylene copolymers with ethylene contents of from 0.2% to about 10% by weight or from about 3 to about 6% by weight. With regard to the propylene-1-butene copolymers, 1-butene contents of up to about 15% by weight are useful. Propylene-1-octene copolymers that are useful in the present invention may contain up to about 40% by weight of 1-octene.

A number of useful propylene copolymers are available commercially and some of these are listed in the following Table II.

TABLE II

Commercial Propylene Copolymers

| Commercial Name | Source | % Ethylene | % 1-Butene | Melt Flow Rate (g/10 mins) | Density (g/cm$^3$) |
|---|---|---|---|---|---|
| DS4D05 | Union Carbide | — | 14 | 6.5 | 0.890 |
| DS6D20 | Union Carbide | 3.2 | — | 1.9 | 0.890 |
| DS6D81 | Union Carbide | 5.5 | — | 5.0 | NA |
| SRD4-127 | Union Carbide | — | 8 | 8.0 | NA |
| SRD4-104 | Union Carbide | — | 11 | 5.0 | NA |
| SRD4-105 | Union Carbide | — | 14 | 5.0 | NA |

In one embodiment, the amount of propylene homopolymer or copolymer, or blend thereof (A-1) contained in the mixture used to form the monolayer films may range from about 25% to about 80% by weight. In other embodiments, the amount may range from about 30% to about 80%, or from about 40% to about 80% by weight of propylene homopolymer or copolymer of blends thereof. In yet other embodiments, the amount of propylene homopolymer or copolymer or blends thereof may range from about 50% to about 80% by weight. In another embodiment, the amount may range from about 55% to about 75% by weight.

A second component of the monolayer film facestocks utilized in the present invention comprises at least one polyethylene. In one embodiment, the polyethylene is a low density polyethylene. The term "low density" as utilized in this application, includes polyethylenes having a density of about 0.935 g/cm$^3$ or less. Polyethylenes having densities of from about 0.850 to about 0.935 g/cm$^3$ generally are referred to as low density polyethylenes. The polyethylenes that are useful in the present invention can be characterized as having a melt flow rate in the range of from about 0.1 to about 20 g/10 min. In another embodiment, the polyethylenes useful in the invention are characterized as having a melt flow rate of from about 1 to about 5 or 10 g/10 min.

The amount of polyethylene included in the monolayer films may range from about 20% to about 75% by weight. In other embodiments, the films contain from about 20% to about 70%, or from about 20% to about 60% by weight of the polyethylene. In yet other embodiments, the films contain from about 25% to about 50% or from about 25% to about 45% by weight of at least one polyethylene (A-2).

The low density polyethylenes useful in this invention are exemplified by the low density polyethylenes (LDPE), the linear low density polyethylenes (LLDPE), the very low density polyethylenes (VLDPE), the ultra low density polyethylenes (ULDPE) and the plastomers which are VLDPEs prepared by single site catalysts.

The low density polyethylenes (LDPE) may comprise homopolymers of ethylene or copolymers of ethylene with alpha olefins such as 1-butene, 1-hexene and 1-octene, or polar monomers such as vinyl acetate, methyl acrylate, or ethyl acrylate. LDPE homopolymers may have a density in the range of from about 0.920 to about 0.935. The amount of comonomers polymerized with the ethylene generally does not exceed 3.5 or 4% by weight.

Linear low density polyethylenes (LLDPE) are copolymers of ethylene and alpha-olefins. Although any alpha olefin containing from 3 to 20 carbon atoms can be used as a comonomer for LLDPE, the four most commonly used are 1-butene, 1-hexene, 4-methyl-1-pentene, and 1-octene. In one embodiment, the LLDPE is characterized as having a density in the range of from about 0.915 to about 0.925 g/cm$^3$.

The very low density (VLDPE) and ultra low density (ULDPE) polymers generally contain less than 4% of a comonomer and are characterized as having a density of less than 0.915 g/cm$^3$.

Very low density polymers prepared using single-site catalysts and referred to in the art as plastomers generally contain higher amounts of comonomer (i.e., up to about 25% by weight), and plastomers are generally characterized as having a density of about 0.912 or less.

Linear low density polyethylenes are available commercially. A number of LLDPEs are available from Dex Plastomers under the general trade designation "STAMYLEX". For example, STAMYLEX® 1016LF is a 1-octene linear low density polyethylene having a melt flow rate of 1.1 g/10 min., a density of about 0.919 g/cm$^3$ and a DSC melting point of 123° C., STAMYLEX® 1026F is a 1-octene liner low density polyethylene having a melt flow rate of 2.2, a density of 0.919 g/cm$^3$, and a DSC melting point of 123° C.; STAMYLEX® 1046F is a 1-octene linear low density polyethylene having a melt flow rate of 4.4 g/10 min., a density of 0.919 g/cm$^3$ and a DSC melting point of 122° C.; STAMYLEX® 1066F is another 1-octene linear low density polyethylene that has a melt flow rate of 6.6 g/10 min., a density of 0.919 g/cm$^3$ and a DSC melting point of 124° C.

Useful LLDPE are also available from *Borealis* A/S (Denmark) under the trade designation BORSTAR®. For example, BORSTAR® FB 4230 is a bimodal linear low density polyethylene film grade having a density of 0.923 g/cm$^3$, a melting temperature (ISO 11357/03) of 124° C. and a melt flow rate (190° C./2.16 kg) of 0.4 g/10 min (ISO 1133); and BORSTAR® FB 2310 is a high molecular weight polyethylene film grade having a density of 0.931 g/cm$^3$, a melt flow rate (190° C./2.16 kg) of 0.2 g/10 min, and a melting temperature of 127° C. Useful LLDPE available from Dow Chemical Co. include DOWLEX® 2042E which is an ethylene/octene-1 copolymer having a density of 0.930 g/cm$^3$ and a melt index (ASTM D1238) of 1 g/10 min; DOWLEX® 2035G having a density of 0.919 g/cm$^3$ and a melt index of 6 g/10 min., and DOWLEX® SC2107, another ethylene/octene-1 copolymer.

An example of a useful LDPE is HIMOD™ FT 5270 from *Borealis* NS. This material has a density of 0.927 g/cm$^3$, a melt flow rate (190° C./2.16 kg) of 0.75 g/10 min, and a melting temperature of 115° C.

In one embodiment, a second component of the monolayer film facestocks utilized in the present invention comprises at least one medium or high density polyethylene. Medium density polyethyenes (MDPE) generally have a density between about 0.935 and 0.940 g/cm$^3$. The term "high density polyethylene" or "HDPE" refers to a polyethylene having a density of about 0.940 to about 0.965 g/cm$^3$.

The plastomers that may be utilized in the films of the present invention are very low density copolymers and terpolymers of ethylene with an alpha olefin, and these plastomers are characterized as having a density of about 0.912 g/cm$^3$ or less. These copolymers typically comprise from about 2 to about 30% or from about 5 to about 25% of the alpha olefin. The alpha olefins, which have been described above, include 1-butene, 1-pentene, 1-hexene, 1-heptene, 1-octene, 1-decene and 1 dodecene. Particularly useful alpha olefins include 1-butene and 1-hexene. An example of an ethylene terpolymer is ethylene-1-hexene-1-butene. These low density ethylene copolymers are obtained by copolymerization of ethylene with an alpha olefin using single-site metallocene catalysts. Such copolymers are available commercially from Exxon Mobil Chemical Company, Basell, and Dow Chemical Company.

Examples of useful ethylene plastomers include the EXACT series plastomers that are available from ExxonMobil Chemical Co. which include linear ethylene-butene copolymers such as EXACT® 3024 having a density of about 0.905 gms/cc and a melt index of about 4.5 g/10 min.; EXACT® 3027 having a density of about 0.900 gms/cc and a melt index of about 3.5 g/10 min.; EXACT® 4011 having a density of about 0.888 gms/cc and a melt index of about 2.2 g/10 min.; EXACT® 4049 having a density of about 0.873 gms/cc and a melt index of about 4.5 g/10 min; and ethylene-hexene copolymers such as EXACT® 4150 having a density of about 0.895 gms/cc and a melt index of about 3.5 g/10 min.

Ethylene plastomers such as those sold by Dow Chemical Co. under the tradename AFFINITY® also may be employed in the invention. These plastomers are believed to be produced in accordance with U.S. Pat. No. 5,272,236, the teachings of which are incorporated herein in their entirety by reference. The ethylene plastomers include interpolymers of ethylene with at least one C3-C20 alpha-olefin and/or C2-C20 acetylenically unsaturated monomer and/or C4-C18 alpha-olefins.

Examples of these ethylene plastomers include AFFINITY® PF 1140 having a density of about 0.897 gms/cc, and a melt flow index of about 0.5 g/10 mins; AFFINITY® PF 1146 having a density of about 0.90 gms/cc, and a melt index of about 1 gms/10 min; AFFINITY® PL 1880 having a density of about 0.902 gms/cc, and melt index of about 1.0 gms/10 min; AFFINITY® EG 8100 having a density of about 0.87 gms/cc, and a melt index of about 1 gms/10 min.; AFFINITY® EG 8150 having a density of about 0.868 gms/cc, and a melt index of about 0.5 gms/10 min.; AFFINITY® EG 8200 having a density of about 0.87 gms/cc, and a melt index of about 5 g/10 min.; and AFFINITY® KC 8552 having a density of about 0.87 gms/cc, and a melt index of about 5 g/10 min.

Examples of terpolymers are Exxon's EXACT® 3006 (an ethylene-butene-hexene terpolymer with a density of 0.910 g/cm$^3$ and M.F.I. of 1.2 g/10 min; EXACT® 3016 (an ethylene-butene-hexene terpolymer having a density of 0.910 g/cm$^3$ and a M.F.I. of 4.5 g/10 min; EXACT® 3033 (an ethylene-butene-hexene terpolymer having a density of 0.900 g/cm$^3$ (g/cc) and a M.F.I. of 1.2 g/10 min (g/10'); EXACT® 3034 (an ethylene-butene-hexene terpolymer having a density of 0.900 g/cm$^3$ (g/cc) and a M.F.I. of 3.5 g/10 min (g/10')); Dow AFFINITY® PL 1840 (an ethylene-propylene-butylene terpolymer); Dow AFFINITY PL 1845 (an ethylene-propylene-butylene terpolymer); Dow AFFINITY® PL 1850 (an ethylene-propylene-butylene terpolymer); and Exxon Mobil ZCE 2005 (an ethylene-propylene-butylene terpolymer).

In one embodiment, the polyethylenes useful in the films used in the present invention include polyethylenes having a melt flow rate (MFR) as determined by ISO 1133 in the range of about 0.1 to about 20, and more often, in the range of about 1 to about 10. In another embodiment, it is desirable for the polyethylene and the propylene homopolymer or copolymer to have about the same viscosity at the extrusion conditions of temperature (200°-240° C.) and shear rate in the extruder.

In one embodiment, the facestock films may be nucleated. Various nucleating agents can be incorporated into the film formulations used in the present invention, and the amount of nucleating agent added should be an amount sufficient to provide the desired modification of the crystal structure while not having an adverse effect on the desired properties of the film. It is generally desired to utilize a nucleating agent to modify the crystal structure and provide a large number of considerably smaller crystals or spherulites to improve the transparency (clarity) of the film. The amount of nucleating agent added to the film formulation should not have a deleterious affect on the clarity of the film. The amounts of nucleating agent incorporated into the film formulations of the present invention are generally quite small and range from about 500, or from about 750 or from about 850 ppm. The nucleating agents may be present in an amount up to 5000, or up to about 3000, or up to about 1000.

Nucleating agents that have been used heretofore for polymer films include mineral nucleating agents and organic nucleating agents. Examples of mineral nucleating agents include carbon black, silica, kaolin and talc. Among the organic nucleating agents that have been suggested as useful in polyolefin films include salts of aliphatic mono-basic or di-basic acids or arylalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium beta-naphtholate, lithium benzoate and aluminum tertiary-butyl benzoate also are useful organic nucleating agents. Wijga in U.S. Pat. Nos. 3,207,735, 3,207,736, and 3,207,738, and Wales in U.S. Pat. Nos. 3,207,737 and 3,207,739, all patented Sep. 21, 1966, suggest that aliphatic, cycloaliphatic, and aromatic carboxylic, dicarboxylic or higher polycarboxylic acids, corresponding anhydrides and metal salts are effective nucleating agents for polyolefin. They further state that benzoic acid type compounds, in particular sodium benzoate, are the best embodiment of the nucleating agents.

In one embodiment, the nucleating agents are sorbitol derivatives or organic phosphates. Substituted sorbitol derivatives such as bis (benzylidene) and bis (alkylbenzilidine) sorbitols wherein the alkyl groups contain from about 2 to about 18 carbon atoms are useful nucleating agents. More particularly, sorbitol derivatives such as 1,3,2,4-dibenzylidene sorbitol, and 1,3,2,4-di-para-methylbenzylidene sorbitol are effective nucleating agents for polypropylenes. Useful nucleating agents are commercially available from a number of sources. MILLAD® 8C-41-10, MILLAD® 3988 and MILLAD® 3905 are sorbitol nucleating agents available from Milliken Chemical Co.

Other acetals of sorbitol and xylitol are typical nucleators for polyolefins and other thermoplastics as well. Dibenzylidene sorbitol (DBS) was first disclosed in U.S. Pat. No. 4,016,118 by Hamada, et al. as an effective nucleating and clarifying agents for polyolefin. Since then, large number of acetals of sorbitol and xylitol have been disclosed. Representative US patents include: Kawai, et al., U.S. Pat. No. 4,314,039 on di(alkylbenzylidene) sorbitols; Mahaffey, Jr., U.S. Pat. No. 4,371,645 on di-acetals of sorbitol having at least one chlorine or bromine substituent; Kobayashi, et al., U.S. Pat. No. 4,532,280 on di(methyl or ethyl substituted benzylidene) sorbitol; Rekers, U.S. Pat. No. 5,049,605 on bis(3,4-dialkylbenzylidene) sorbitols including substituents forming a carbocyclic ring. These patents are hereby incorporated by reference. These patents are hereby incorporated by reference.

The machine direction oriented monolayer films used in the present invention may also contain antiblocking agents. The addition of antiblocking agents to the film formulations reduces the tendency of the films to block during windup, regulates the slip and anti-static properties of the films and allows a smooth unwinding from the reels. Any of the antiblocking agents described in the prior art as useful additives modifying the properties of polymer films, and in particular, olefin polymer films, can be included in the film formulations of the present invention. Silicas with average particle sizes of about 2 microns or less can be utilized for this purpose, and only small amounts (for example, 1000 to 5000 ppm) of the fine silica are needed. Several antiblocking agents based on synthetic silica are available from A. Schulman, Inc., Akron, Ohio, under the general trade designation POLYBATCH®. These materials are antiblocking masterbatches and comprise free-flowing pellets comprising propylene homopolymers or copolymers and the synthetic silica. For example, POLYBATCH® ABPP-05 comprises 5% synthetic silica in a propylene homopolymer; ABPP-10 comprises 10% synthetic silica in a propylene homopolymer; and ABPP-05SC comprises 5% synthetic silica and a random propylene copolymer. When the antiblocking agents are to be utilized in the preparation of the multilayer films of the present invention, the antiblocking agent generally is added to the skin layer formulations only. Useful antiblocking agents are Ampacet's Seablock 1 and Seablock 4.

In another embodiment, the film compositions may contain at least one processing aid. The processing aid acts to facilitate extrusion. These processing aids include hexafluorocarbon polymers. An example of a commercially available processing aid that can be used is AMPACET® 10919 which is a product of Ampacet Corporation identified as a hexafluoro carbon polymer. Another example of a useful processing aid is AMPACET® 401198. The processing aids are typically used at concentrations of up to about 1.5% or form about 0.5% to about 1.2% by weight. In another embodiment, the processing aid is present in an amount up to about 0.25% by weight, and in one embodiment about 0.03% to about 0.15% by weight.

The film compositions used in the present invention also may contain other additives and particulate fillers to modify the properties of the film. For example, colorants may be included in the film such as $TiO_2$, $CaCO_3$, etc. The presence of small amounts of $TiO_2$, for example, results in a white facestock. Antiblock agents also can be included in the formulations. AB-5 is an antiblock concentrate available from A. Schulman Inc., Akron, Ohio which comprises 5% solid synthetic amorphous silica in 95% low density polyethylene. ABPP05SC is an antiblock concentrate from Schulman containing 5% of a synthetic amorphous silica antipropylene copolymer. The amount of antiblock agent (silica) present in the formulations may range from about 500 to 5000 ppm.

In some embodiments, particularly where it is desired that the film is clear, the film is free of inert particulate filler material although very small amounts of particulate filler material may be present in the film due to impurities, etc. The term "free of" as used herein, is intended to mean that the film contains less than about 0.1% by weight of the particulate filler material. Films that are free of particulate filler are particularly useful when it is desired to prepare a film that is clear and that may be characterized as having low haze, for example, less than 10% or even less than 6% haze.

Haze or clarity is determined using a BYK-Gardner haze-gloss meter as known in the art.

The following examples in Table III illustrate some of the compositions that are useful in the preparation of the machine direction oriented monolayer films used in the present invention. Unless otherwise indicated in the following examples, in the claims, and elsewhere in the written description, all parts and percentages are by weight, temperatures are in degrees centigrade, and pressures are at or near atmospheric pressure.

TABLE III

Exemplary Film Compositions

| | Propylene Polymer | | Ethylene Polymer | |
|---|---|---|---|---|
| Example | Name | Amt (% w) | Name | Amt (% w) |
| 1 | SABIC® PP 575P | 60 | STAMYLEX® 1066F | 40 |
| 2 | SABIC® PP 575P | 60 | STAMYLEX® 1016LF | 40 |
| 3 | SABIC® PP 575P | 60 | STAMYLEX® 1026F | 40 |
| 4 | SABIC® PP 500P | 60 | STAMYLEX® 1016F | 40 |
| 5 | SABIC® PP 500P | 60 | STAMYLEX® 1066F | 40 |
| 6 | SABIC® PP 500P | 70 | STAMYLEX® 1066F | 30 |
| 7 | SABIC® PP 500P | 80 | STAMYLEX® 1016LF | 30 |
| 8 | SABIC® PP 520P | 40 | DOWLEX® SC2107 | 60 |
| 9 | SABIC® PP 500P | 45 | STAMYLEX® 1066F | 55 |
| 10 | SABIC® PP 520P | 35 | DOWLEX® SC2107 | 65 |
| 11 | SABIC® PP 520P | 30 | DOWLEX® SC2107 | 70 |
| 12 | SABIC® PP 571P | 50 | STAMYLEX® 1026F | 50 |
| 13 | SABIC® PP 571P | 55 | STAMYLEX® 1026F | 45 |
| 14 | SABIC® PP 571P | 45 | STAMYLEX® 1026F | 55 |
| 15 | SABIC® PP 520P | 50 | STAMYLEX® 1026F | 50 |
| 16 | SABIC® PP 520P | 45 | STAMYLEX® 1026F | 55 |
| 17 | SABIC® PP 520P | 40 | STAMYLEX® 1026F | 60 |
| 18 | SABIC® PP 520P | 25 | STAMYLEX® 1026F | 75 |
| 19 | SABIC® PP 520P | 60 | DOWLEX® SC2107 | 40 |

The monolayer films useful in the present invention are prepared by extrusion techniques well known to those skilled in the art, and the films may range in thickness of from about 0.5 mils (12.5 microns) to about 3, 4 or 5 mils. More often, the films have a thickness of from about 2 to about 3 mils. It has been discovered that such down gauged films exhibit desirable stiffness and modulus values to provide films that are die-cuttable/dispensable in high speed dispensing, and conformable. In one embodiment, the films are stretch oriented in the machine direction only.

As noted above, the monolayer films utilized in the present invention are films that have been oriented in the machine direction. In one embodiment, the machine direction oriented films are obtained by hot-stretching films in the machine direction at a stretch ratio of at least 2:1. In other embodiments of the invention, the films are hot stretched at ratios of at least about 3:1, or at least 5:1 or at least about 6:1 or at least about 7:1 up to about 9:1 or 10:1. In one embodiment, the films are hot stretched at a ratio of 6:1 to about 9:1.

One feature of the present invention is that the hot stretching is carried out at a temperature within the range of from about the melting temperature of the polyethylene up to the melting temperature of the propylene polymer or copolymer used in the mixture to form the film. The term "melting temperature" as used herein refers to the DSC melting point of the polymers (DIN 53765). It has been discovered that when the hot stretching is conducted at about or above the melting temperature of the polyethylene and below the melting temperature of the polypropylene, improved die-cuttability and printability are obtained. Accordingly, typical stretching temperatures, depending upon the particular polyethylene used, may range from about 115° to 145° C. In other embodiments, stretching temperatures at or above about 125° C. are utilized. Stretching at such higher temperatures generally results also in a low shrinkage film (for example e.g., less than 2% shrinkage at 70° C.)

In one embodiment, the monolayer films (or the multilayer films of the invention described below) that have been stretch oriented in the machine direction while in a heated condition are then passed over heated annealing rolls where the stretched films are annealed or heat-set. After the heat setting or annealing operation, the film is then passed over chill rolls to complete the stretch and heat-set operations. The temperature used in the heat setting step (as with the stretching step) depends on the particular polymers used in the blends, and these temperatures may range from about 100° C. to about 150° C. The temperature used for the hot stretching and heat setting steps may be about the same, although in some instances, the temperature of heat setting is lower than the temperature used for heat stretching. In one embodiment, the temperature of the annealing rolls may be from about 100° C. to about 140° C., and in another embodiment, the annealing temperature may range from about 110° C. to about 135° C.

Figure 1B:
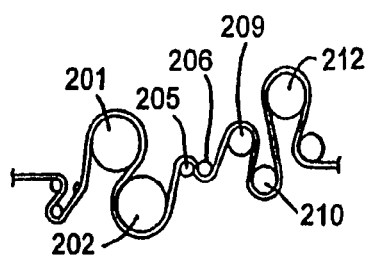
Figure 1C:

In one embodiment, the extruded monolayer films, which are machine-direction oriented, may be prepared by the general procedure described and illustrated in FIGS. 1A-1C. The polymer compositions are melted, and the melted charges are extruded through extrusion die 190 as schematically illustrated in FIG. 1A. The extruded film is cast onto a cooled first casting roll 191, continues around a cooled second casting roll 192, and is advanced by pull-off rolls 193. The second cooling roll is not always required.

As mentioned above, the stiffness of the film is important to the proper dispensing of the labels at higher line speeds. FIG. 1B illustrates a hot-stretching station at which the stiffness of the flatstock M is increased in the machine-direction by orienting the film in the machine direction at the stretch ratios described above. Stretching in the machine direction also increases the MD tensile modulus of the film, which contributes to dimensional stability and good print registration. As also noted above, it has been observed that stretching at a temperature at about or above the melting temperature of the polyethylene component of the polymer mixture results in improved die-cuttability and printability of the film.

After passing the flatstock M around pre-heat rolls 201 and 202 which soften the stock, the softened flatstock is then stretched between the heated orientation roll pair 205 and 206, the latter rotating at a multiple of the speed of the pre-heat rolls 201 and 202, corresponding to the desired stretch ratio of, for example, 7:1. After stretching, the stock then passes over the annealing rolls 209 and 210 at which the stock is annealed or heat set, and finally, the stock passes over the chill roll 212 to complete the hot stretch operation. The stock may then be taken up in roll form as shown in FIG. 1C.

The following Examples A-V in Table IV illustrate the preparation of the machine direction oriented monolayer films utilized in the present invention. The films are prepared utilizing the general procedure described above utilizing the casting, pre-heat, stretching and annealing temperatures, and the stretch ratios specified in Table IV. Control films, identified as Examples C-A through C-F also are prepared utilizing the same apparatus, but utilizing lower stretching temperatures.

TABLE IV

Film Preparation Temperatures (° C.)

|  | Film Formulation | Casting Rolls | Preheat Rolls | Stretching Rolls | Annealing | Stretch Ratio | Caliper (μm) |
|---|---|---|---|---|---|---|---|
| Film | | | | | | | |
| A | Example 1 | 65 | 105 | 125 | 110 | 7:1 | 57 |
| B | Example 3 | 63 | 105 | 125 | 110 | 9:1 | 48 |
| C | Example 3 | 63 | 105 | 135 | 110 | 9:1 | 52 |
| D | Example 4 | 60 | 105 | 125 | 110 | 7:1 | 54 |
| E | Example 5 | 60 | 105 | 125 | 110 | 7:1 | 46 |
| F | Example 2 | 67 | 105 | 125 | 110 | 7:1 | 48 |
| G | Example 3 | 63 | 105 | 125 | 110 | 7:1 | 52 |
| H | Example 8 | 65 | 110 | 125 | 105 | 6:1 | 61 |
| I | Example 8 | 65 | 110 | 125 | 105 | 8:1 | 59 |
| J | Example 10 | 65 | 105 | 125 | 105 | 8:1 | 59 |
| K | Example 11 | 65 | 110 | 125 | 105 | 8:1 | 64 |
| L | Example 12 | 65 | 110 | 125 | 105 | 6:1 | 58 |
| M | Example 13 | 65 | 110 | 125 | 105 | 6:1 | 59 |
| N | Example 13 | 65 | 110 | 125 | 105 | 8:1 | 59 |
| O | Example 14 | 65 | 110 | 125 | 105 | 6:1 | 59 |
| P | Example 14 | 65 | 110 | 125 | 105 | 8:1 | 60 |
| Q | Example 15 | 65 | 110 | 125 | 105 | 6:1 | 68 |
| R | Example 15 | 65 | 110 | 125 | 105 | 8:1 | 61 |
| S | Example 16 | 65 | 110 | 125 | 105 | 6:1 | 59 |
| T | Example 16 | 65 | 110 | 125 | 105 | 8:1 | 59 |
| U | Example 17 | 65 | 110 | 125 | 105 | 6:1 | 62 |
| V | Example 17 | 65 | 110 | 125 | 105 | 8:1 | 67 |
| Control Film Preparations | | | | | | | |
| Control Film | | | | | | | |
| C-A | Example 1 | 65 | 105 | 105 | 110 | 7:1 | 56 |
| C-B | Example 5 | 60 | 105 | 105 | 95 | 7:1 | 44 |
| C-C | Example 4 | 60 | 105 | 105 | 100 | 7:1 | 57 |
| C-D | Example 2 | 67 | 105 | 105 | 110 | 7:1 | 49 |
| C-E | Example 12 | 65 | 110 | 120 | 105 | 6:1 | 58 |
| C-F | Example 14 | 65 | 110 | 115 | 105 | 8:1 | 38 |
| C-G | Example 10 | 65 | 105 | 120 | 105 | 8:1 | 57 |

Machine-direction oriented multilayer films also may be utilized in the present invention. The multilayer films generally will comprise (A) a base layer having an upper surface and a lower surface and comprising a mixture of at least one propylene polymer or copolymer and at least one polyethylene, and (B) at least one skin layer on the upper surface of the base layer or on both the upper and lower surfaces of the base layer wherein the skin layer comprises from about 25% to about 80% by weight of at least one propylene homopolymer or copolymer or a blend of at least one propylene homopolymer or copolymer, and from about 20% to about 75% by weight of at least one polyethylene wherein the machine direction oriented multilayer film is obtained by stretching the multilayer film in the machine direction at a stretching temperature of from the melting temperature of the polyethylene up to the melting temperature of the propylene polymer or copolymer. The discussion above with regard to the compositions of the monolayer films is applicable to the skin layer also. That is, the compositions described above as being useful for the monolayer films also are useful for the skin layer or layers.

In one embodiment, the propylene homopolymer or copolymer content in the base layer is greater than the propylene homopolymer or copolymer content in the skin layers. Thus, the mixture utilized in the base layer may comprise from about 30% or about 50% or about 60% or even 70% up to about 95% or even 99% by weight of polypropylene, and from about 1 or 5% up to about 70% of the polyethylene. For example, in one embodiment of the invention, the base layer comprises about 60% by weight of a propylene homopolymer and about 40% by weight of an LLDPE, and the skin layer comprises about 40% of a propylene homopolymer or a random propylene copolymer and about 60% of an LLDPE.

Generally, the base layer is relatively thick compared to the skin layer or layers. Thus, in one embodiment, the thickness of the base layer is about 5 to 10 or more times the thickness of the skin layer. For example, thickness ratios for two layered films (base:first skin) include 50:5, 45:10, and 45:5, and for three layered films (first skin:base:second skin) 5:50:5, etc.

In one embodiment the multilayer films comprising a base layer and at least one skin layer may be prepared by coextrusion of the layers or by laminating preformed layers together as known in the art. The layers of the coextrudate may be formed by simultaneous extrusion from a suitable known type of coextrusion die, and the layers are adhered to each other in a permanently combined state. In some embodiments, the base layer may be relatively thick compared to the skin layer or layers.

In one embodiment, the propylene homopolymers or copolymers utilized in the base layer are the same as the propylene homopolymers or copolymers utilized in the skin layer(s), and in another embodiment, the propylene homopolymers or copolymers are different. Similarly, in one embodiment, the polyethylene utilized in the base layer is the same as the polyethylene utilized in the skin layer(s), or the polyethylene utilized in the base layer may be different from the polyethylene utilized in the core layer. Where different polyethylenes are utilized in the mixtures of the base layer and the mixtures of the skin layer(s), the stretching temperature utilized in the orientation of the film is at least the melting temperature of the lower melting polyethylene.

Any of the propylene homopolymers and copolymers and the polyethylenes described above as being useful in the monolayer films may be used in the base layer and the skin layer or skin layers of the multilayer films.

The multilayer films may be prepared by means known to those skilled in the art. Typically, the films are coextruded at temperatures between 120° to about 290° C. or from about 150° to about 260° C. A useful procedure for preparing the multilayer films is coextrusion at 230° C. The coextruded multilayer films are oriented in the machine direction in the same manner and under the same conditions as described above for the monolayer films. That is, the stretch orientation of the multilayer film is carried out at a temperature at about or above the melting temperature of the polyethylene(s) in the base and skin layer(s). If more than one type of polyethylene is included in the multilayer film, the film is stretch oriented at a temperature at or above the highest melting polyethylene. The stretch oriented multilayer films may then be annealed or heat set as described above with regard to the monolayer films. Thus, the procedure described above with respect to FIGS. 1A, 1B and 1C is also applicable to the multilayer films.

In the coextruded machine direction oriented multilayer films as described above wherein the base layer contains an increased amount of propylene homopolymer or copolymer, such base layers are characterized as having higher stiffness than would be obtained if a lower amount of polypropylene were used in the base layer. Also, in one embodiment, satisfactory adhesion of the skin layer or layers to the base layer is adhered without the need for an adhesive tie layer between the base layer and the skin layer or layers.

The following Example AA illustrates the preparation of a machine direction oriented multilayer film in accordance with the present invention.

Example AA

The film formulation of Example 19 and the film formulation of Example 8 are coextruded by simultaneous extrusion through a coextrusion die, and the two layers are adhered to each other in a permanently combined state. A thickness of each of the layers is adjusted to provide a two layer film, after stretching having a total thickness of about 60 microns with a thickness of the base layer being 10 times the thickness of the skin layer. The two layer film is then preheated, stretched and annealed with the procedures described above for the monolayer films utilizing a casting temperature of 65° C., a preheat temperature of 110° C., a stretching temperature of 125° C. and an annealing temperature of 105° C. The stretch ratio is 8:1. The oriented two layer film obtained in this manner is characterized as having a caliper of 61 microns.

In another embodiment the invention relates to a process for preparing machine direction oriented multilayer film labelstock that comprises
(A) preparing a multilayer film facestock comprising
  (A-1) a base layer comprising a mixture of at least one propylene polymer or copolymer and a polyethylene polymer and having an upper surface and a lower surface
  (A-2) at least one skin layer in contact with a surface of the base layer wherein the skin layer comprises a mixture of
    (A-2a) from about 25% to about 80% by weight of at least one propylene homopolymer or copolymer or a blend of at least one propylene homopolymer and at least one propylene copolymer, and
    (A-2b) from about 20% to about 75% by weight of at least one polyethylene
(B) stretch orienting the multilayer film in the machine direction at a stretching temperature at about or above the melting temperature of the polyethylene up to the melting temperature of the propylene homopolymer or copolymer, and
(C) applying an adhesive layer having an upper surface and a lower surface wherein the upper surface of the adhesive layer is joined to the lower surface of the multilayer film.

In one embodiment, the stretch oriented multilayer film obtained in (B) is annealed or heat set before applying the adhesive layer in (C).

One of the features of the relatively thin films used in the invention, prepared as described above, is that the stiffness of the thin films in the machine direction is sufficiently high to provide for improved properties such as high speed dispensability, and the stiffness in the cross direction is sufficiently low as to provide a die cut label that is conformable. In one embodiment, the MD stiffness of the films is at least 20 mN, and in other embodiments, the MD stiffness is at least 25, or at least 28 or at least 30 or even 35 mN. The stiffness of the films described above in the cross direction (CD) is much less than the MD. Thus, for example, in one embodiment, the MD stiffness is at least 2 to 3 times the CD stiffness. In other embodiments, the MD stiffness is from about 3 to about 5 times the CD stiffness.

The stiffness of the machine-direction oriented monolayer and multilayer films utilized in the present invention is determined using an L&W Bending Resistance Tester (Test Method: ISO 2493). In general, the relationship between the L&W stiffness in mN to the Gurley stiffness as measured by TAPPI T543PM-84 is as follows: L+W=1.75×Gurley.

The results of the L+W stiffness tests on the films of Examples A-G and AA, and comparative films CA-CF, as determined by Test Method ISO 2493, are summarized in Table IV. In the tests, the bending angle is 15°; the distance between the measuring edge and the pivoting ax is 5 mm; the height of the sample is 38 mm; and the length of the sample is sufficient to be clamped and to touch, with an overlap, the measuring edge (typically about 50 mm).

One of the advantages of the labelstock and labels of the present invention is that useful labels can be prepared that are thinner than many of the labels presently utilized in the art. Accordingly, it has been discovered that labelstocks and labels of the invention containing a facestock having a thickness of from 25 to 75 microns (1 to 3 mils) or from about 45 to about 65 microns are useful in high speed dispensing. Accordingly, the L&W stiffness values for the films utilized in the invention (e.g., films A through G and AA) and the control films (films C-A through C-F) are corrected to 55 microns to provide an indication of their relative utility at this thickness. The correction to 55 microns utilizes the following equation where m is the measured thickness of the film tested.

$$MD_{55}=MD_m \times (55/m)^3$$

This calculation is based on the assumption that the film is homogenous in the thickness; that is, the modulus of elasticity is the same throughout the thickness.

The films that have been described above and that are useful in the facestocks and labels of the invention also are characterized as having a much higher modulus in the MD than in the CD. In one embodiment, the modulus of the films in the MD may be about 2500 MPa or higher, and the modulus in the CD as low as 400 or 500 MPa. In another embodiment, the MD modulus is at least 3.5 or at least 4 times the CD modulus. Modulus is Young=s modulus measured according to ISO 527-1 using a Zwick Z010.

The facestock films described above and which are utilized in the preparation of the labelstocks and labels of the present invention also are characterized by having a low shrinkage. In one embodiment, the films exhibit a shrinkage of less than 3% or even less than 2% at 70° C. In one embodiment, the films exhibit a shrinkage of less than 1% at 70° C. In this test, after conditioning the film at 23° C. and 50% relative humidity, the length of a film is measured before and after immersion in water at 70° C. for 2 minutes, and the shrinkage is calculated by the formula: (length before−length after/length before).

The results of the shrinkage testing of the films of Examples A to G and Comparative Examples CA to CD are summarized in Table V.

The facestock films described above and which utilized in the labelstocks and labels of the present invention also are characterized as having improved printability, particularly, with UV based inks that are most commonly used to print pressure sensitive labels, without reducing other desirable properties such as die-cuttability, shrinkage, etc. The printability of the labelstocks and labels of the present invention is determined by corona treating the film on a Vetaphone Corona Plus TF-415 at 50 W-min/m$^2$. Subsequently a layer of 2.1 to 2.7 g/m$^2$ of Uvonova Process Magenta UNV30080 from XSYS is applied with an IGT C1 printability tester. The ink is UV cured on a Primarc Minicure at 30 m/min and 80 W/cm, and the ink adhesion is evaluated with the tape test method with SCOTCH® 810 tape according to ASTMD3359 directly and after 24 hours. In this test ink adhesion or anchorage is evaluated by applying a SCOTCH® 810 tape with pressure to the top of the printed image, and the tape is then quickly removed. The amount of ink remaining in the film tape is noted on a scale of 0 to 5, a A0" representing complete transfer of the ink to the tape, a A1" representing severe ink transfer to the tape, and a A5" representing no ink transfer to the tape.

The results of the ink adhesion testing on the film of Examples A to G and Comparative Examples C-A to C-D are summarized in Table V. The results of the ink adhesion testing on the films of Examples H-V, AA and control films CE and CF are summarized in Table VI. As shown therein, the machine direction oriented films of Examples A to G, which were stretch oriented at a temperature above the melting temperature of the polyethylene, exhibited better ink adhesion as compared with the films C-A to C-D, which were stretched at a lower temperature.

In one embodiment, the present invention relates to a die-cuttable and printable adhesive-containing a labelstock for use in adhesive labels. The films that have been described above are utilized as facestock films in the labelstocks and labels of the present invention. Labelstocks generally comprise the machine direction oriented monolayer or multilayer films (facestocks) described above and an adhesive layer. The adhesive layer generally is in contact with and adhesively joined to the surface of the monolayer films. A protective release liner may be attached to the exposed surface of the adhesive layer.

Figure 2A:
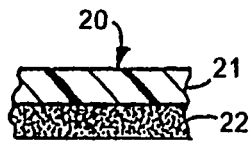
FIG. 2A is a cross-section of a labelstock in accordance with the present invention.

FIG. 2A illustrates one embodiment of the labelstock of the present invention useful in preparing adhesive labels. The labelstock that is generally referred to by the numeral 20 comprises a monolayer 21 of the machine direction monolayer film facestock described above and an adhesive layer 22 which is adhesively joined to the lower surface of the film 21.

Figure 2B:
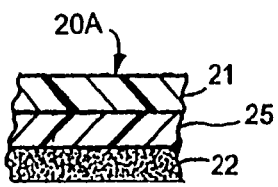
FIG. 2B is a cross section of another labelstock in accordance with the present invention.
Figure 2C:
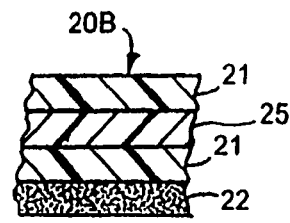
FIG. 2C is a cross section of another labelstock in accordance with the present invention.

FIG. 2B illustrates another embodiment of the labelstock of the invention useful in preparing adhesive labels. In this embodiment, the facestock film of the labelstock that is generally referred to by the numeral 20A comprises two layers, a base layer 25 as described above and a skin layer 21 which corresponds to the monolayer films described above. The facestocks that comprises the base layer 25 and the skin layer 21 have been machine direction oriented as described above prior to contact with adhesive layer 22 which is adhesively joined to the lower surface of the base layer 25. FIG. 2C illustrates another embodiment of the labelstock of the invention generally referred to by the numeral 20B. Labelstock 20B comprises a multilayer facestock which itself comprises base layer 25 and skin layers 21 on the two surfaces of the base layer, and an adhesive layer 22 which is adhesively joined to the lower surface of skin layer 21. As indicated above, the facestocks that comprises the base layer 25 and the skin layers 21 is machine direction oriented as described above prior to being adhesively joined to the adhesive layer 22.

The adhesive layer utilized in the labelstocks of the present invention such as illustrated in FIGS. 2A, 2B and 2C may be directly coated on the lower surface of the indicated layers, or the adhesive may be transferred from a release liner with which the facestock is combined. Typically, the adhesive layer has a thickness of from about 0.4 to about 1.6 mils (10 to about 40 microns). Adhesives suitable for use in labelstocks of the present invention are commonly available in the art. Generally, these adhesives include pressure-sensitive adhesives, heat-activated adhesives, hot melt adhesives, etc. Pressure-sensitive adhesives (PSAs) are particularly preferred. These include acrylic based adhesives as well as other elastomers such as natural rubber or synthetic rubber containing polymers or copolymers of styrene, butadiene, acrylonitrile, isoprene and isobutylene. PSAs are also well known in the art and any of the known adhesives can be used with the facestocks of the present invention. In one preferred embodiment, the PSAs are based on copolymers of acrylic acid esters, such as, for example, 2-ethyl hexyl acrylate, with polar comonomers such as acrylic acid.

In one embodiment, the present invention relates to the preparation of die-cut machine direction oriented monolayer film labels by a procedure that comprises (A) extruding a monolayer film facestock having an upper surface and a lower surface and comprising a mixture of
  (A-1) from about 25% to about 80% by weight of at least one propylene homopolymer or copolymer or a blend of at least one propylene homopolymer and at least one propylene copolymer, and
  (A-2) from about 20% to about 75% by weight of at least one polyethylene (B) stretch orienting the extruded film in the machine direction at a stretching temperature at about or above the melting temperature of the polyethylene up to the melting temperature of the propylene homopolymer or copolymer, (C) applying an adhesive layer having an upper surface and a lower surface wherein the upper surface of the adhesive layer is joined to the lower surface of the film.

(D) applying a release liner to the lower surface of the adhesive layer, and (E) die-cutting labels in the adhesive labelstock.

In another embodiment die cut machine direction oriented film labels are prepared by the procedure that comprises (A) preparing a multilayer film facestock comprising (A-1) a base layer comprising a mixture of at least one propylene polymer or copolymer and a polyethylene polymer and having an upper surface and a lower surface (A-2) at least one skin layer in contact with a surface of the base layer wherein the skin layer comprises a mixture of (A-2a) from about 25% to about 80% by weight of at least one propylene homopolymer or copolymer or a blend of at least one propylene homopolymer and at least one propylene copolymer, and (A-2b) from about 20% to about 75% by weight of at least one polyethylene wherein the propylene content of the base layer is greater than the propylene content of the skin layer (B) stretch orienting the film in the machine direction at a stretching temperature at about or above the melting temperature of the polyethylene up to the melting temperature of the propylene homopolymer or copolymer, (C) applying an adhesive layer having an upper surface and a lower surface wherein the upper surface of the adhesive layer is joined to the lower surface of the multilayer film, (D) applying a release liner to the lower surface of the adhesive layer, and (E) die-cutting labels in the adhesive labelstock.

As indicated above, the stretch oriented films may be annealed or heat set prior to applying the adhesive layer, and the adhesive layer and the release liner may be joined to the monolayer and multilayer film facestock in one step by initially coating the adhesive on a release liner and then applying the exposed adhesive surface to the film facestock.

Figure 3A:
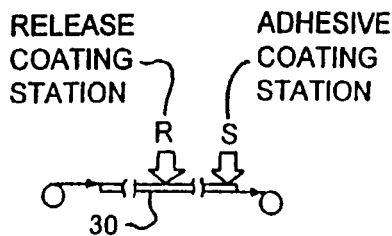
FIG. 3A is a schematic illustration showing the application of a release coating and an adhesive to a liner or carrier stock.
Figure 3B:
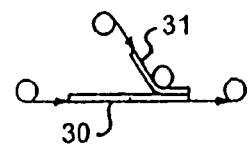
FIG. 3B is a schematic illustration showing adjoining of the liner or carrier stock from FIG. 3A to a facestock.

The manufacture of labelstocks and die-cut labels in accordance with the invention is illustrated in FIGS. 3A-3D. As noted above, in the manufacture of labelstocks of the invention using the above-described machine direction oriented monolayer films as facestocks in accordance with the invention, liner or carrier stock may be provided. The liner or carrier stock 30 may comprise a multilayer liner made for example as disclosed in U.S. Pat. No. 4,713,273, the disclosure of which is incorporated herein by reference, or may be conventional liner or carrier consisting of a single paper or film layer that may be supplied in roll form. If it has not been previously provided with a release coating and does not itself include components to inherently generate a release surface at its adhesive-contacting face, the liner or carrier 30 may be coated with a release coating at station R, as shown in FIG. 3A. If a release coating is applied, it is dried or cured following application by any suitable means (not shown). If the liner or carrier 30 comprises a plastic extrudate, then prior to application of the release coating at station R, the formed films may be hot-stretched to provide orientation of the liner or carrier 30.

The release face of the release liner or carrier may be coated with a layer of adhesive for subsequent transfer of the adhesive to the facestock with which the liner or carrier is joined. When the facestock is combined with the liner or carrier, the adhesive is joined to the facestock. Later, the liner or carrier is removed to expose the adhesive, which now remains permanently joined to the facestock.

Thus, as indicated in FIG. 3A, adhesive may be applied at station S following drying or cure of the release coat previously applied at station R. This may be a tandem coating operation, or the adhesive coating may be on a separate coating line. Alternatively, the adhesive may be applied at some later time prior to the joining of the release liner or carrier 30 with the facestock 31. The joining of the liner or carrier with a facestock 71 is diagrammatically illustrated in FIG. 3B. Alternatively, the adhesive may be coated directly on the facestock 31 prior to the combining of the facestock and liner or carrier.

In some applications, the adhesive may be a heat-activated adhesive or a hot-melt adhesive such as used in in-mold label applications, as distinguished from a pressure-sensitive adhesive, in which case there may be no need for the provision of a release liner or inherent releasability such as is required when using a pressure-sensitive adhesive.

The label facestock may be printed at a printing station (not shown) prior to being die-cut into individual labels. The printing step may occur before or after the combining of liner and facestock, but will precede the die-cutting of the facestock into individual labels. The film must remain in accurate register between printing steps (for example, between successive impressions in different colors) in order that image or text be of high quality, and between printing and subsequent die-cutting in order that image or text be located properly on the labels. The film is under tension during printing, and may be subjected to some increase in temperature, as for example when UV inks are cured, and must not stretch significantly in the machine-direction. The MD tensile properties of the facestock film are particularly important when a polymeric film liner is used or when no liner is required.

Figure 3C:
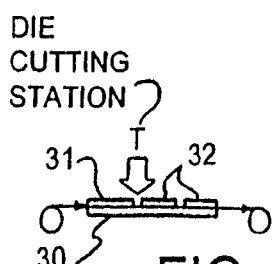
FIG. 3C is a schematic illustration showing die-cutting of the facestock from FIG. 3B to make a series of spaced adhesive labels carried by the liner or carrier stock.
Figure 3D:
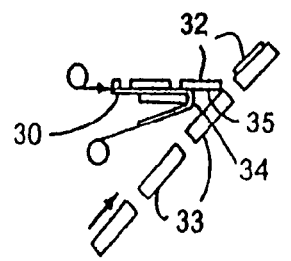
FIG. 3D is a schematic illustration showing the application of the labels from FIG. 3C to passing workpieces.

FIG. 3C diagrammatically illustrates the die-cutting of the facestock 31, at a station T, into a series of spaced pressure-sensitive labels 32 carried by the release liner or carrier 30. This step may be performed by, for example, rotary or flat bed metal cutting dies in a well-known manner and involves the stripping of the ladder-shaped matrix (not shown) of waste or trim surrounding the formed labels after they are die cut (the "rungs" of the ladder representing the spacing between successive labels). The labels then remain on the liner in spaced relation with each other, as shown. One failure mode in this operation involves poorly die-cut labels remaining with the matrix as it is stripped. In this mode, as release levels decrease, poor die-cutting is more likely to cause labels to stay attached to the matrix material and be removed from the liner during matrix stripping. FIG. 3D illustrates the application of the labels 32 to passing workpieces 33 by use of a peel-back edge 34 to dispense the labels 32 by progressively removing the liner or carrier from them to thereby expose the adhesive side 35 of the labels and project the labels into contact with passing workpieces 33.

The workpieces 33 may constitute rigid substrates such as glass bottles or other rigid articles tending to have irregularities in the surface and therefore requiring labels that are flexible and closely adhere (conform) to the surface without bridging local surface depressions. Alternatively, the workpieces may be soft, flexible substrates such as plastic containers requiring labels that flex when the container is flexed.

It will be understood that the operations shown in FIGS. 3A to 3D may be carried out at different locations by different manufacturers, or they may be combined. For example, the steps of FIG. 3A may be performed by a liner and adhesive manufacturer, the steps of FIGS. 3B and 3C may be performed by a label manufacturer on one continuous pass rather than being interrupted by a wind/unwind sequence as illustrated, and the steps of FIG. 3D may be performed by a package of manufactured products.

Facestock that is formed into labels is usually wound and unwound in roll form, and is therefore one form of what is known as "roll stock" or "roll facestock," and the accompanying liner or carrier is called "roll liner."

One important advantage of the monolayer machine direction oriented film facestocks described above and which are used in the die-cut labels of the invention is the improved die-cuttability of the labels. It has been observed, for example, that die-cutting of the labels of the present invention provides sharp and distinct cuts with full separation of the label from the matrix along the cut label edge being achieved at a lower die-cutting pressure, and the cutting tool does not have to be as sharp when cutting the facestock label films of the present invention. Failure to achieve a clean die-cut perimeter between the label and surrounding matrix can cause the matrix to break, in either the machine or cross directions, and remain with the label on the release liner. This defect will adversely affect the dispensing operation by applying a double label or label plus matrix strip(s) to the substrate.

The die-cuttability of the films prepared from the compositions of the examples at the elevated stretching temperatures is evaluated by die-cutting shapes in the films and thereafter measuring the frictional energy (DFE) required to separate the matrix from the die-cut shape. As described below, the frictional energy is calculated by measuring the force required to separate the die cut shape from its matrix, during the displacement of the test sample. A low frictional energy value indicates the laminate exhibits good die-cuttability. This test which is conducted as follows is described in more detail in U.S. Pat. No. 5,961,766 which is hereby incorporated by reference.

A test sheet of each film having the dimensions of 7×10" (17.8×25.4 cm) is advanced through a die-cutter where 10 labels are cut in the facestock. The die-cutter has a cylindrical profile. The die-cutting roll has a diameter of 3 inches (76.2 mm), with one cavity across and 10 cavities around. Each of the cavities are 6 inches (152.4 mm) long (or across), 1 5/16 inch (22.25 mm) wide (or deep) and have rounded corners with diameters of 3/32 inch (2.38 mm). The separation between adjacent cavities is 1/8 inch (3.175 mm). The anvil roll has a diameter of 5 inches (127 mm). The gap between the anvil and the tip of the die is 2.2 mils (0.0559 mm). The die pressure is 300 psi (0.2 Mpa), and the speed of the die is 15 m/min.

The die-cut in each test sheet is deep enough to penetrate the film. The labels that are formed are rectangular in shape and arranged side-by-side on the test sheet, one label across and ten deep. The long dimension of each label is parallel to the long dimension of the next adjacent label. The labels have the dimensions of 7/8×6" (22.25 mm×152.4 mm) and are equidistant from each other. The gap between each label is 1/8 inch (3.175 mm). A matrix, which consists of the portion of the waste facestock around the labels, is also formed during the die-cutting.

A test sample is formed by cutting the die-cut test sheet along the center line of the long dimension of one label and then along the center line of the long dimension of the next adjacent label. The cuts are parallel to each other. Each test sample consists of one-half of one label, one-half of the next adjacent label sample, and the matrix around the label portions.

The frictional energy (DFE) required to separate the matrix from the die-cut labels of each sample is measured using a modified TA-XT2 Texture Analyzer provided by Stable Micro Systems, Unit 105, Blackdown Rural Industries, Haste Hill, Haslemere, Surrey GU 27 3AY, England. The TA-XT2 Texture Analyzer is a tensile testing device. It is modified as follows: the fixture on the top crosshead is removed and substituted by an upper L-shaped bracket; one arm of the upper L-shaped bracket is attached to the upper frame; the platform mounted on the base is removed and substituted by a lower L-shaped bracket. Each test sample is tested by attaching an edge of the matrix of the test sample to the upper L-shaped bracket, and attaching the edge of each label portion adjacent to the attached matrix edge to the lower L-shaped bracket. The texture analyzer is activated and the matrix is separated from the label portions at a rate of 5 mm/s.

The force used to separate the matrix, and the displacement of this force along the length of the test sample during separating is plotted using software provided with the TA-XT2 Texture Analyzer. The area under the plot is also determined using software provided with the TA-XT2 Texture Analyzer. The area under the plot has the units of gram-seconds. The result is multiplied by the stripping speed (5 mm/sec) and after making appropriate corrections for units (i.e., mm to cm), the friction energy results are provided in terms of gram-centimeters (g-cm). Higher friction energy numbers are associated with poorly cut facestocks or adhesive flowback.

For each film, 10 test samples are tested and the averages for these test samples are reported. A reading of zero (0) indicates a clean cut label completely free from the matrix after die cutting.

The results of the frictional energy tests on the films of Examples A-V, AA, and Control Examples CA to CG are summarized in Tables V and VI. As shown therein the machine direction oriented films of Examples A to G, which were stretch oriented at a temperature above the melting temperature of the polyethylene exhibited good die-cuttability whereas the corresponding films stretched at lower temperature split or were not readily and clearly cuttable.

TABLE V

| | Film Properties | | | | | | | | | |
|---|---|---|---|---|---|---|---|---|---|---|
| | L + W Stiffness (mN) | | L + W Stiffness (mN$^1$) | | Shrinkage (%) | Modulus (MPa) | | DFE | Ink Adhesion | |
| Films | MD | CD | MD | CD | 2 min, 70° C. | MD | CD | (g · cm) | Initial | 24 H |
| Invention | | | | | | | | | | |
| A | 34.1 | 10 | 31 | 9 | 2.3 | 2536 | 810 | 88 Good | 2-3 | 3-4 |
| B | 29.4 | 7.1 | 46 | 11 | 1.9 | 3596 | 820 | 136 Good | 2-3 | 3 |
| C | 33.8 | 8.9 | 41 | 10 | 1.9 | 3586 | 855 | 76 Good | 2 | 3 |

TABLE V-continued

Film Properties

| Films | L + W Stiffness (mN) MD | L + W Stiffness (mN) CD | L + W Stiffness (mN¹) MD | L + W Stiffness (mN¹) CD | Shrinkage (%) 2 min, 70° C. | Modulus (MPa) MD | Modulus (MPa) CD | DFE (g · cm) | Ink Adhesion Initial | Ink Adhesion 24 H |
|---|---|---|---|---|---|---|---|---|---|---|
| D | 29.3 | 9.6 | 33 | 10 | 3.3 | 2662 | 790 | 106 Good | 2 | 2-3 |
| E | 18.5 | 5.6 | 28 | 11 | 3.0 | 2446 | 767 | 86 Good | 3 | 3-4 |
| F | 16.8 | 5.8 | 27 | 9 | 2.3 | 2556 | 801 | 89 Good | 2-3 | 3 |
| G | 26.1 | 9 | 29 | 11 | 2.7 | 3302 | 1072 | 88 Good | 2 | 2-3 |
| Controls | | | | | | | | | | |
| C-A | 37.3 | 12.4 | 38 | 11 | 2.7 | 3302 | 1072 | Splits | 1 | 1-2 |
| C-B | 21.5 | 5 | 38 | 12 | 4.3 | 3200 | 1154 | Splits | 1 | 1 |
| C-C | 36.8 | 14.6 | 33 | 14 | 5.1 | 2869 | 1015 | 651 Poor | 1 | 1-2 |
| C-D | 22.8 | 7.9 | 32 | 11 | 3.1 | 2921 | 1034 | Splits | 1 | 1-2 |

¹corrected to a thickness of 55 μm.

TABLE VI

Film Properties

| Films | L + W Stiffness (mN) MD | L + W Stiffness (mN¹) MD | DFE (g · cm) | Ink Adhesion Initial | Adhesion 24 H |
|---|---|---|---|---|---|
| Invention | | | | | |
| H | 22 | 16 | 24 | 4 | 4 |
| I | 29 | 23 | 18 | 4-5 | 4 |
| J | 24 | 20 | 23 | 4 | 4-5 |
| K | 28 | 17 | 14 | 4-5 | 4-5 |
| L | 28 | 24 | 59 | 4-5 | 5 |
| M | 28 | 23 | 59 | 3-4 | 5 |
| N | 38 | 30 | 73 | 4 | 4-5 |
| O | 22 | 18 | 45 | 3-4 | 4 |
| P | 29 | 23 | 29 | 4 | 4 |
| Q | 31 | 16 | 46 | 4 | 4-5 |
| R | 40 | 30 | 28 | 4-5 | 4-5 |
| S | 28 | 22 | 39 | 3-4 | 4 |
| T | 32 | 26 | 78 | 4-5 | 4-5 |
| U | 31 | 22 | 37 | 4 | 4-5 |
| V | 46 | 25 | 11 | 4-5 | 5 |
| AA | 45 | 33 | | 4-5 | 5 |
| Controls | | | | | |
| C-E | 27 | 23 | 97 | 4-5 | 5 |
| C-F | 12 | 38 | 439 | 3 | 3 |
| C-G | 26 | 23 | 154 | 3-4 | 4 |

While the invention has been explained in relation to its embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A die-cuttable and printable adhesive containing labelstock for use in adhesive labels that comprises
    (A) an extruded machine direction oriented monolayer film facestock having an upper surface and a lower surface and comprising
        (A-1) a propylene constituent having from about 55% to about 75% by weight of at least one propylene homopolymer or copolymer or a blend of at least one propylene homopolymer and at least one propylene copolymer, and
        (A-2) from about 25% to about 45% by weight of at least one polyethylene chosen from a linear low density polyethylene having a density in a range of from about 0.915 to about 0.925 g/cm³, a low density polyethylene having a density in a range of from about 0.920 to about 0.935 g/cm³, a medium density polyethylene having a density in a range of from about 0.935 to about 0.940 g/cm³, and a high density polyethylene having a density in a range of from about 0.940 to about 0.965 g/cm³,
    wherein the facestock (A) is obtained by stretching the extruded facestock (A) in the machine direction at a stretching temperature at or above a melting temperature of the polyethylene up to a melting temperature of the propylene constituent, and
    (B) an adhesive layer having an upper surface and a lower surface wherein the upper surface of the adhesive layer is adhesively joined to the lower surface of the facestock (A),
    wherein the propylene homopolymer or copolymer (A-1) has a viscosity and the polyethylene (A-2) has a viscosity, and
    wherein the viscosities of (A-1) and (A-2) are about the same at extrusion conditions of temperature and shear rate.

2. The labelstock of claim 1 wherein (A-1) is a propylene homopolymer.

3. The labelstock of claim 1 wherein (A-1) comprises a copolymer of propylene and at least one alpha olefin selected from ethylene and alpha olefins containing from 4 to 8 carbon atoms.

4. The labelstock of claim 1 wherein (A-1) has a melt flow rate of from about 1 to about 20 g/10 min.

5. The labelstock of claim 1 wherein (A-2) is an ethylene copolymer.

6. The labelstock of claim 1 wherein the polyethylene (A-2) has a density of about 0.915 to about 0.925 g/cm³.

7. The labelstock of claim 1 wherein polyethylene (A-2) is a linear low density polyethylene.

8. The labelstock of claim 1 wherein the polyethylene (A-2) is a copolymer of ethylene and 1-octene.

9. The labelstock of claim 1 wherein the polyethylene (A-2) has a melt flow rate of from about 0.1 to about 10 g/10 min.

10. The labelstock of claim 1 wherein the facestock (A) also comprises at least one nucleating agent.

11. The labelstock of claim 1 wherein the facestock (A) has been oriented by stretching in the machine direction at a stretch ratio of from about 3:1 to about 10:1.

12. The labelstock of claim 1 wherein the facestock (A) has been oriented by stretching in the machine direction at a stretch ratio of from about 6:1 to about 9:1.

13. The labelstock of claim 1 wherein the adhesive layer is a pressure sensitive adhesive layer.

14. The labelstock of claim 1 wherein a L+W MD stiffness of the facestock (A) is at least about 20 mN.

15. The labelstock of claim 1 wherein a L+W MD stiffness of the facestock A is at least about 28 mN.

16. The labelstock of claim 1 wherein a MD stiffness of the facestock (A) is at least 3 times a CD stiffness.

17. The labelstock of claim 1 wherein the facestock (A) has been machine direction oriented and heat set.

18. The label stock of claim 1 wherein the polyethylene (A-2) has a density in the range of about 0.915 to about 0.925 g/cm$^3$, or in the range of from about 0.920 to about 0.935 g/cm$^3$, and wherein the machine direction oriented film is obtained by stretching the extruded facestock (A) a ratio of from about 6:1 to about 9:1.

19. The labelstock of claim 18 wherein (A-1) is a propylene homopolymer having a melt flow rate of from about 1 to about 20 g/10 min.

20. The labelstock of claim 18 wherein (A-2) is an ethylene-butene copolymer, an ethylene-hexene copolymer, an ethylene-octene copolymer, or mixtures of two or more thereof.

21. The labelstock of claim 18 wherein the polyethylene (A-2) has a melt flow rate of from about 0.2 to about 10 g/10 min.

22. The labelstock of claim 18 wherein the facestock (A) has an L&W MD stiffness of from about 20 to about 50 mN.

23. The labelstock of claim 18 wherein the facestock (A) has an L&W MD stiffness of from about 28-50 mN.

24. An adhesive label die-cut from the labelstock of claim 1.

25. The labelstock of claim 1 wherein the polyethylene (A-2) has a density in the range of from about 0.920 to about 0.935 g/cm$^3$.

26. The labelstock of claim 1 wherein the polyethylene (A-2) has a density in the range of from about 0.935 to about 0.940 g/cm$^3$.

27. The labelstock of claim 1 wherein the facestock (A) exhibits a shrinkage of less than 3% at 70° C.

28. The labelstock of claim 1 wherein the facestock (A) exhibits a shrinkage of less than 2% at 70° C.

29. The labelstock of claim 1 wherein the facestock (A) exhibits a shrinkage of less than 1% at 70° C.

30. A process for preparing die-cuttable and printable adhesive containing labelstocks that comprises
   (A) extruding a monolayer film facestock having an upper surface and a lower surface and comprising a mixture of
      (A-1) from about 55% to about 75% by weight of at least one propylene homopolymer or copolymer or a blend of at least one propylene homopolymer and at least one propylene copolymer, and
      (A-2) from about 25% to about 45% by weight of at least one polyethylene chosen from a linear low density polyethylene having a density in a range of from about 0.915 to about 0.925 g/cm$^3$, a low density polyethylene having a density in a range of from about 0.920 to about 0.935 g/cm$^3$, a medium density polyethylene having a density in a range of from about 0.935 to about 0.940 g/cm$^3$, and a high density polyethylene having a density in a range of from about 0.940 to about 0.965 g/cm$^3$,
   (B) stretch orienting the facestock (A) in a machine direction at a stretching temperature at or above a melting temperature of the polyethylene up to a melting temperature of the propylene homopolymer or copolymer, and
   (C) applying an adhesive layer having an upper surface and a lower surface wherein the upper surface of the adhesive layer is joined to the lower surface of the facestock (A),
   wherein the propylene homopolymer or copolymer (A-1) has a viscosity and the polyethylene (A-2) has a viscosity, and
   wherein the viscosities of (A-1) and (A-2) are about the same at extrusion conditions of temperature and shear rate.

31. The process of claim 30 wherein the extruded facestock (A) is stretch oriented in the machine direction at a stretch ratio of from about 6:1 to about 10:1.

32. The process of claim 30 wherein the stretch oriented facestock (A) is heat set prior to application of the adhesive layer.

33. The process of claim 30 wherein the polyethylene has a density of about 0.915 to about 0.925 g/cm$^3$.

34. The process of claim 30 further comprising applying a release liner to the lower surface of the adhesive layer prior to die-cutting labels in the adhesive labelstock.

35. The process of claim 34 wherein the adhesive layer and release liner are applied in one step by applying an adhesive side of a release liner coated on one side with the adhesive layer to the lower surface of the facestock (A).

36. A die-cuttable and printable adhesive containing labelstock for use in adhesive labels that comprises
   (A) a machine direction oriented multilayer film facestock that comprises
      (A-1) a base layer comprising a mixture of at least one propylene homopolymer or copolymer and a polyethylene polymer and having an upper surface and a lower surface, and
      (A-2) at least one skin layer in contact with a surface of the base layer wherein the at least one skin layer comprises a mixture of
         (A-2a) from about 55% to about 75% by weight of at least one propylene homopolymer or copolymer or a blend of at least one propylene homopolymer and at least one propylene copolymer, and
         (A-2b) from about 25% to about 45% by weight of at least one polyethylene chosen from a linear low density polyethylene having a density in a range of from about 0.915 to about 0.925 g/cm$^3$, a low density polyethylene having a density in a range of from about 0.920 to about 0.935 g/cm$^3$, a medium density polyethylene having a density in a range of from about 0.935 to about 0.940 g/cm$^3$, and a high density polyethylene having a density in a range of from about 0.940 to about 0.965 g/cm$^3$,
      wherein facestock (A) is obtained by stretching facestock (A) in the machine direction at a stretching temperature at or above a melting temperature of the polyethylene up to a melting temperature of the propylene homopolymer or copolymer, and
   (B) an adhesive layer having an upper surface and a lower surface wherein the upper surface of the adhesive layer is adhesively joined to a lower surface of the facestock (A),
   wherein the propylene homopolymer or copolymer (A-2a) has a viscosity and the polyethylene (A-2b) has a viscosity, and wherein the viscosities of (A-2a) and (A-2b) are about the same at extrusion conditions of temperature and shear rate.

37. The labelstock of claim 36 wherein the facestock (A) is machine direction oriented and heat set.

38. The labelstock of claim 36 wherein the polyethylene of at least one of (A-1) and (A-2b) has a density of about 0.915 to about 0.925 g/cm$^3$.

39. The labelstock of claim 36 wherein the propylene homopolymer or copolymer content in the base layer is greater than the propylene homopolymer or copolymer content in the at least one skin layer or skin layers.

40. The labelstock of claim 36 wherein the polyethylene (A-2b) has a density in the range of from about 0.920 to about 0.935 g/cm$^3$.

41. The labelstock of claim 36 wherein the polyethylene (A-2b) has a density in the range of from about 0.935 to about 0.940 g/cm$^3$.

42. A process for preparing a machine direction oriented multilayer film labelstock that comprises
(A) preparing a multilayer film facestock comprising
(A-1) a base layer comprising a mixture of at least one propylene homopolymer or copolymer and a polyethylene polymer and having an upper surface and a lower surface, and
(A-2) at least one skin layer in contact with a surface of the base layer wherein the skin layer comprises a mixture of
(A-2a) from about 55% to about 75% by weight of at least one propylene homopolymer or copolymer or a blend of at least one propylene homopolymer and at least one propylene copolymer, and
(A-2b) from about 25% to about 45% by weight of at least one polyethylene chosen from a linear low density polyethylene having a density in a range of from about 0.915 to about 0.925 g/cm$^3$, a low density polyethylene having a density in a range of from about 0.920 to about 0.935 g/cm$^3$, a medium density polyethylene having a density in a range of from about 0.935 to about 0.940 g/cm$^3$, and a high density polyethylene having a density in a range of from about 0.940 to about 0.965 g/cm$^3$,
(B) stretch orienting the facestock (A) in the machine direction at a stretching temperature at or above a melting temperature of the polyethylene up to a melting temperature of the propylene homopolymer or copolymer, and
(C) applying an adhesive layer having an upper surface and a lower surface wherein the upper surface of the adhesive layer is joined to a lower surface of the facestock (A),
wherein the propylene homopolymer or copolymer (A-2a) has a viscosity and the polyethylene (A-2b) has a viscosity, and
wherein the viscosities of (A-2a) and (A-2b) are about the same at extrusion conditions of temperature and shear rate.

43. The process of claim 42 wherein the polyethylene of at least one of (A-1) and (A-2b) has a density of about 0.915 to about 0.925 g/cm$^3$.

44. The process of claim 42 wherein the propylene homopolymer or copolymer content in the base layer is greater than the propylene homopolymer or copolymer content in the at least one skin layer or skin layers.

45. The process of claim 42, further comprising annealing the stretch oriented facestock (A) prior to applying the adhesive layer.

46. The process of claim 42 wherein the facestock (A) is coextruded.

47. The process of claim 46 further comprising (D) applying a release liner to the lower surface of the adhesive layer and (E) die cutting labels in the film labelstock.

48. A die-cuttable and printable adhesive containing labelstock for use in adhesive labels that comprises
(A) an extruded machine direction oriented monolayer film facestock having an upper surface and a lower surface and comprising
(A-1) a propylene constituent having from about 55% to about 75% by weight of at least one propylene homopolymer or copolymer or a blend of at least one propylene homopolymer and at least one propylene copolymer, and
(A-2) from about 25% to about 45% by weight of at least one polyethylene having a melting temperature equal to or greater than 122° C.,
wherein facestock (A) is obtained by stretching the extruded facestock (A) in the machine direction at a stretching temperature at or above a melting temperature of the polyethylene up to a melting temperature of the propylene constituent, and
(B) an adhesive layer having an upper surface and a lower surface wherein the upper surface of the adhesive layer is adhesively joined to the lower surface of the facestock (A),
wherein the propylene homopolymer or copolymer (A-1) has a viscosity and the polyethylene (A-2) has a viscosity, and
wherein the viscosities of (A-1) and (A-2) are about the same at extrusion conditions of temperature and shear rate.

49. The labelstock of claim 48 wherein the facestock (A) exhibits a shrinkage of less than 3% at 70° C.

50. The labelstock of claim 48 wherein the facestock (A) exhibits a shrinkage of less than 2% at 70° C.

51. The labelstock of claim 48 wherein the facestock (A) exhibits a shrinkage of less than 1% at 70° C.

52. A die-cuttable and printable adhesive containing labelstock for use in adhesive labels that comprises
(A) a machine direction oriented multilayer film facestock that comprises
(A-1) a base layer comprising a mixture of at least one propylene homopolymer or copolymer and a polyethylene polymer and having an upper surface and a lower surface, and
(A-2) at least one skin layer in contact with a surface of the base layer wherein the at least one skin layer comprises a mixture of
(A-2a) from about 55% to about 75% by weight of at least one propylene homopolymer or copolymer or a blend of at least one propylene homopolymer and at least one propylene copolymer, and
(A-2b) from about 25% to about 45% by weight of at least one polyethylene having a melting temperature equal to or greater than 122° C.,
wherein facestock (A) is obtained by stretching the facestock (A) in the machine direction at a stretching temperature at or above a melting temperature of the polyethylene up to a melting temperature of the propylene homopolymer or copolymer, and
(B) an adhesive layer having an upper surface and a lower surface wherein the upper surface of the adhesive layer is adhesively joined to a lower surface of the facestock (A), wherein the propylene homopolymer or copolymer (A-2a) has a viscosity and the polyethylene (A-2b) has a viscosity, and
wherein the viscosities of (A-2a) and (A-2b) are about the same at extrusion conditions of temperature and shear rate.

* * * * *